US008045345B2

(12) United States Patent
    Kono

(10) Patent No.: US 8,045,345 B2
(45) Date of Patent: Oct. 25, 2011

(54) POWER CONVERTING APPARATUS

(75) Inventor: Masaki Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 12/444,648

(22) PCT Filed: Oct. 18, 2007

(86) PCT No.: PCT/JP2007/001136
    § 371 (c)(1),
    (2), (4) Date: Apr. 7, 2009

(87) PCT Pub. No.: WO2008/047479
    PCT Pub. Date: Apr. 24, 2008

(65) Prior Publication Data
    US 2010/0033996 A1    Feb. 11, 2010

(30) Foreign Application Priority Data
    Oct. 19, 2006   (JP) ................. 2006-284522

(51) Int. Cl.
    *H02M 5/40*    (2006.01)
(52) U.S. Cl. ................. 363/34; 363/39; 363/95
(58) Field of Classification Search .............. 363/34, 363/37, 39, 40, 41, 95, 98
    See application file for complete search history.

(56) References Cited

U.S. PATENT DOCUMENTS

| 4,876,637 | A | * | 10/1989 | Mose et al. ........... 363/37 |
| 5,136,494 | A | * | 8/1992 | Akagi et al. ........... 363/34 |
| 5,450,306 | A | * | 9/1995 | Garces et al. .......... 363/41 |
| 5,504,667 | A | * | 4/1996 | Tanaka et al. .......... 363/37 |
| 7,379,313 | B2 | * | 5/2008 | Yaguchi .............. 363/98 |
| 2004/0124807 | A1 | | 7/2004 | Nakata et al. |
| 2004/0228151 | A1 | * | 11/2004 | Matsushiro et al. ...... 363/37 |
| 2006/0044848 | A1 | * | 3/2006 | Suzuki et al. ......... 363/37 |
| 2009/0160380 | A1 | * | 6/2009 | Yamada et al. ...... 318/400.15 |
| 2010/0033996 | A1 | * | 2/2010 | Kono ................ 363/37 |
| 2010/0118569 | A1 | * | 5/2010 | Kono et al. .......... 363/34 |

(Continued)

FOREIGN PATENT DOCUMENTS

JP        60 62866        4/1985

(Continued)

OTHER PUBLICATIONS

Korean Office Action issued Nov. 17, 2010, in Patent Application No. 10-2009-7007885 (with English-language translation).

(Continued)

*Primary Examiner* — Jeffrey Sterrett
(74) *Attorney, Agent, or Firm* — Oblon, Spivak, McClelland, Maier & Neustadt, L.L.P.

(57) ABSTRACT

A detected DC voltage value estimation mechanism samples detected DC voltage values at specific intervals of a period T, stores detected DC voltage values $V_n$ to $V_{n-m}$ detected at a present time $t_n$ up to a sampling time $t_{n-m}$ which is m sampling cycles ($m \geq 1$) before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a specific function. An output voltage control into which the DC voltage estimation value $V_{n+1}$ is input corrects an output voltage command value and outputs the corrected output voltage command value to a power converter.

16 Claims, 18 Drawing Sheets

U.S. PATENT DOCUMENTS

2010/0128502 A1* 5/2010 Kawamoto et al. ............. 363/34
2010/0194329 A1* 8/2010 Lu et al. ........................ 318/798
2010/0308649 A1* 12/2010 Kono et al. ................... 307/9.1

FOREIGN PATENT DOCUMENTS

| JP | 63 277492 | 11/1988 |
|---|---|---|
| JP | 2004 147433 | 5/2004 |
| JP | 2004-147433 | 5/2004 |
| JP | 2005 20986 | 1/2005 |
| JP | 2005-20986 | 1/2005 |
| JP | 2005-94826 | 4/2005 |
| JP | 2005 151744 | 6/2005 |
| JP | 2007 306306 | 11/2007 |
| RU | 2001494 C1 | 10/1993 |

OTHER PUBLICATIONS

U.S. Appl. No. 12/596,992, filed Oct. 22, 2009, Kono, et al.

Office Action issued May 7, 2010, in Australian Patent Application No. 2007311340.

* cited by examiner

SAMPLING INTERVALS: 250 μsec
FREQUENCY OF PULSATION COMPONENT: 120 Hz

Time (sec.)

SAMPLING INTERVALS: 800 μsec
FREQUENCY OF PULSATION COMPONENT: 120 Hz

SAMPLING INTERVALS: 1.66666 msec
FREQUENCY OF PULSATION COMPONENT: 120 Hz

SAMPLING INTERVALS: 180 μsec
FREQUENCY OF PULSATION COMPONENT: 120 Hz

SAMPLING INTERVALS: 100 μsec
FREQUENCY OF PULSATION COMPONENT: 120 Hz

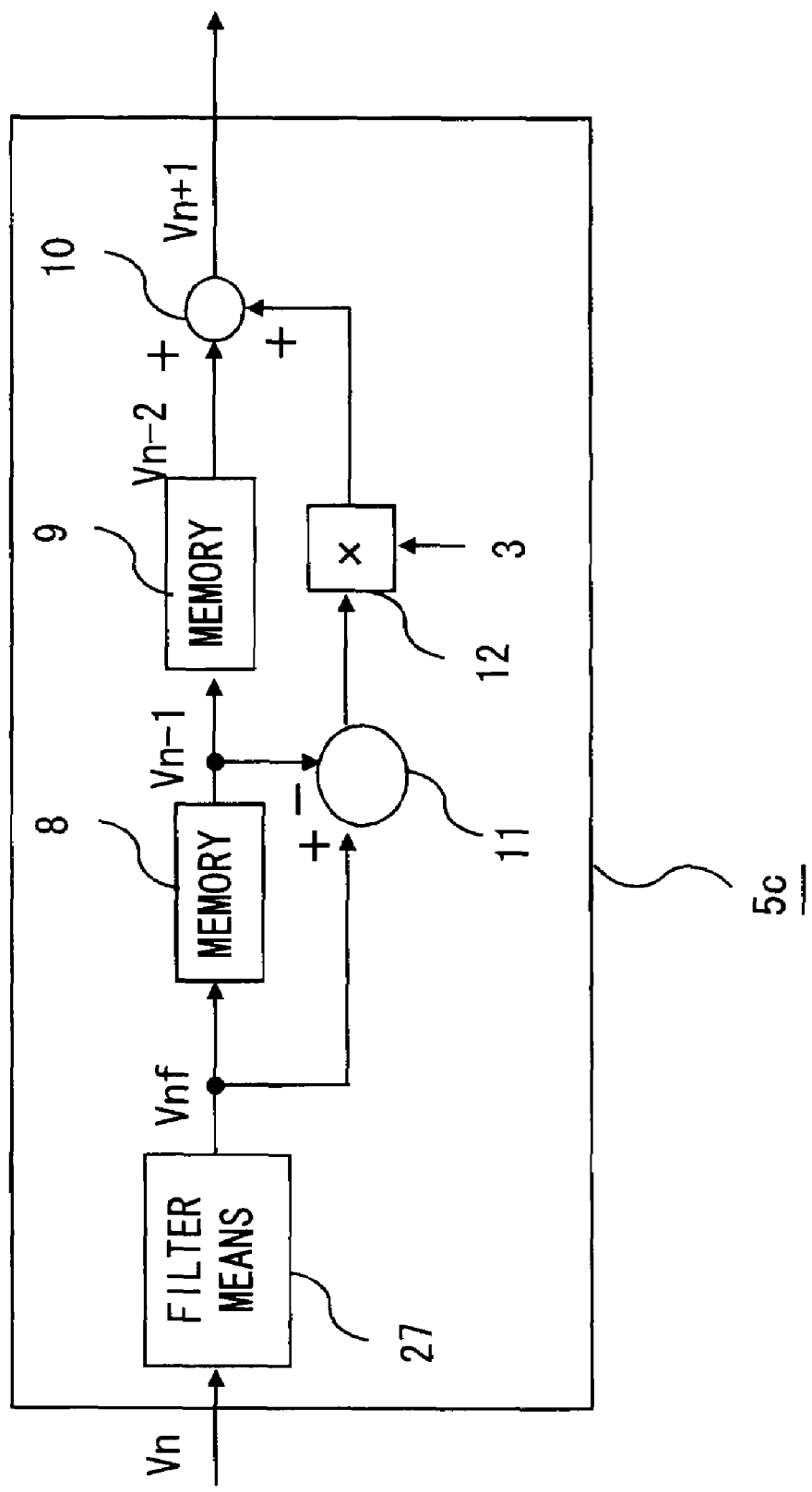

POWER CONVERTING APPARATUS

TECHNICAL FIELD

The present invention relates to a power converting apparatus of which output voltage pulsation is reduced by correcting an output voltage of a power converter.

BACKGROUND ART

It is a conventional practice to reduce pulsation of torque produced by a load like an AC motor, for example, connected to a power converter (inverter) by detecting a DC voltage of rectification means for rectifying AC power, correcting an output voltage of the inverter using information on this DC voltage, and suppressing pulsation of the output voltage of the inverter caused by periodic pulsation of the aforementioned DC voltage. As a result of recent advance in technology, it is now required that torque output by this kind of AC motor, for example, using an inverter be controlled more and more precisely.

To cope with such a requirement, the prior art discloses an inverter output voltage correcting apparatus for suppressing output voltage pulsation of an inverter caused by DC voltage pulsation due to an imbalance of phase-to-phase voltages of a three-phase AC power supply or a reduction in capacity of a capacitor of rectification means, for instance. This inverter output voltage correcting apparatus corrects an output voltage command value according to variations in DC voltage by using a microcomputer and controls the inverter by using the output voltage command value thus corrected, the inverter output voltage correcting apparatus including detected DC voltage value estimation means for estimating a detected DC voltage value at a waveform output timing from a detected DC voltage value obtained at a point of a preceding carrier interrupt and that obtained at a point of a present carrier interrupt (Patent Document 1, for example).

Patent Document 1: Japanese Laid-open Patent Application No. 2004-147433

DISCLOSURE OF THE INVENTION

Problems to be Solved by the Invention

An arrangement shown in Patent Document 1 however detects the DC voltage in synchronism with a carrier period so that there is a problem that it is impossible to detect the DC voltage at sampling times unsynchronized with a carrier frequency. Also, since the detected DC voltage value at the waveform output timing is estimated from the preceding and present detected DC voltage values, pulsation of the individual detected values are not recognized in the form of a function, and for this reason, a large error occurs in the estimated value, thus causing a problem in suppressing the output voltage pulsation of the inverter more exactly.

Furthermore, what is shown in this Patent Document 1 is the arrangement applied to a three-phase AC power supply. Thus, if this arrangement is applied to a single-phase AC power supply, the estimated value of the DC voltage detection can greatly deviate from a true DC voltage at around amplitude peaks of a varying DC voltage, causing a so-called beat phenomenon in which an output current of an inverter considerably fluctuates. This will result in a problem that torque pulsation occurs in an AC motor to be driven, for example, potentially causing eventual breakage of devices in the inverter.

The present invention is intended to overcome the aforementioned problems. Accordingly, it is an object of the invention to provide a power converting apparatus which suppresses output voltage pulsation of an inverter more precisely regardless of whether an AC power supply is of a single-phase type or a three-phase type.

Means for Solving the Problems

A power converting apparatus of the present invention is provided with a power converter into which a DC voltage of rectification means for rectifying an AC power supply is input, the power converter being configured to control and drive a load, voltage sensing means for detecting the DC voltage of the rectification means, detected DC voltage value estimation means into which a detected DC voltage value detected by the voltage sensing means is input, the detected DC voltage value estimation means being configured to output the DC voltage estimation value, and output voltage control means into which an output of the detected DC voltage value estimation means is input, the output voltage control means being configured to control an output voltage of the power converter.

The detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles ($m \geq 1$) before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a specific function. The output voltage control means into which the DC voltage estimation value $V_{n+1}$ is input corrects an output voltage command value and outputs the corrected output voltage command value to the power converter.

Advantageous Effects of the Invention

According to the power converting apparatus of the present invention, it is possible to calculate a DC voltage estimation value by expressing fluctuating values of the DC voltage rectified by the rectification means by a specific function and correct the output voltage of the power converter more precisely by using the estimation value to reduce output voltage pulsation of the power converter. It is therefore possible to suppress the beat phenomenon of an output current of the power converter and set specific sampling intervals. As the sampling intervals can be made unsynchronized with a carrier frequency, an advantageous effect is obtained in that the invention can provide a power converting apparatus applicable to either a single-phase or three-phase AC power supply.

BRIEF DESCRIPTION OF THE DRAWINGS

FIG. 18 is a block diagram showing a power converting apparatus according to a seventh embodiment of the present invention.

BEST MODES FOR CARRYING OUT THE INVENTION

Best modes for carrying out the present invention are now described in the following with reference to the drawings.

First Embodiment

Figure 1:
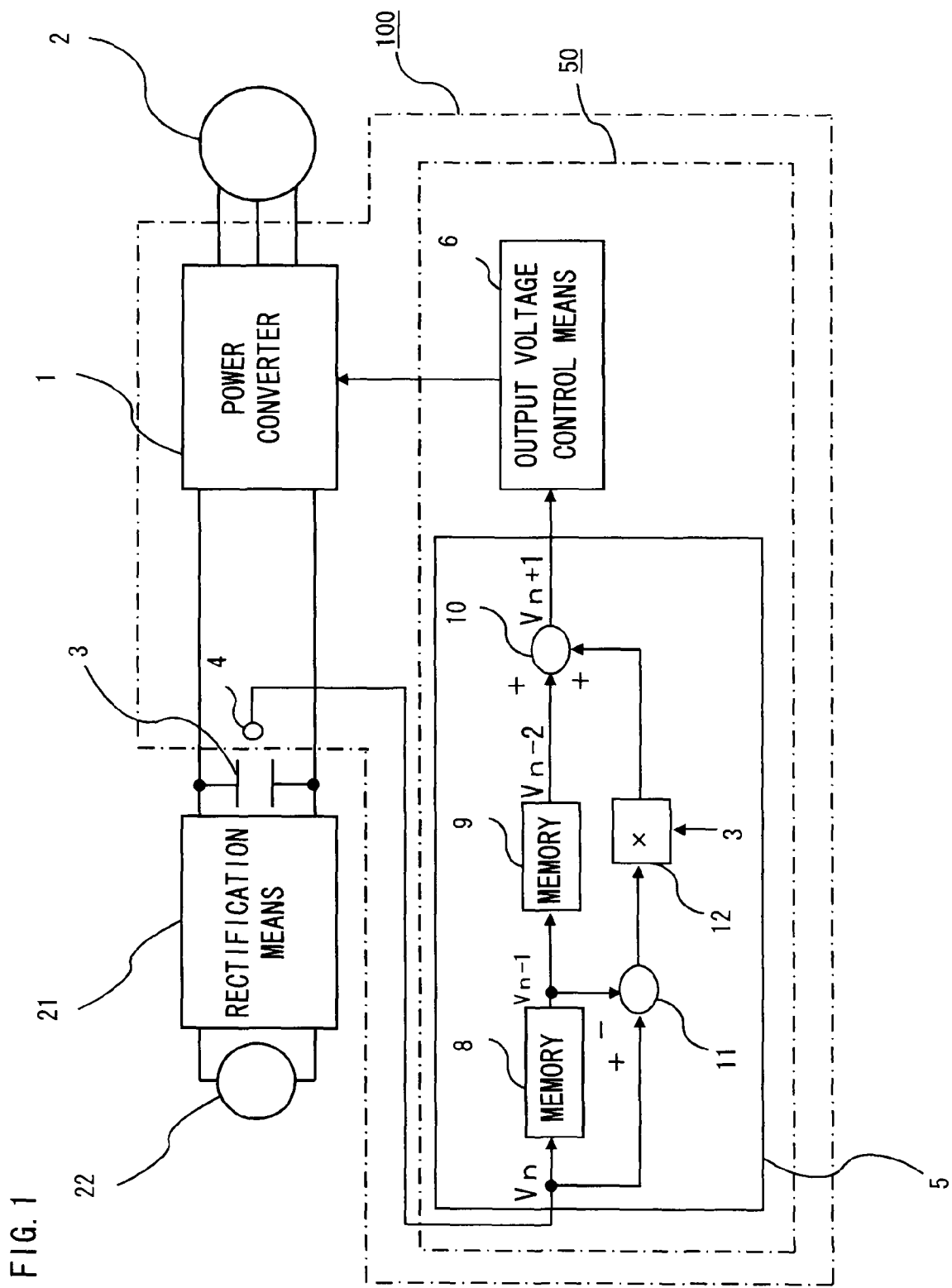
FIG. 1 is a block diagram showing a power converting apparatus according to a first embodiment of the present invention.

FIG. 1 is a block diagram showing the configuration of a power converting apparatus 100 according to a first embodiment of the present invention. Referring to FIG. 1, an output of a single-phase or three-phase AC power supply 22 is rectified by rectification means 21 and a DC voltage thus rectified is input into a power converter 1 through a filter capacitor 3. This power converter 1 controls and drives an AC rotary machine 2 acting as a load based on an output signal of a later-described microcomputer 50.

Voltage sensing means 4 detects the DC voltage across the filter capacitor 3 and outputs the result of detection to the microcomputer 50. The microcomputer 50 is configured with detected DC voltage value estimation means 5 which will be described later in detail and output voltage control means 6 which receives an output of the detected DC voltage value estimation means 5 and suppresses pulsation of an output voltage of the power converter 1. Also, the power converting apparatus 100 of the first embodiment is configured with the voltage sensing means 4, the microcomputer 50 and the power converter 1 mentioned above.

Figure 2:
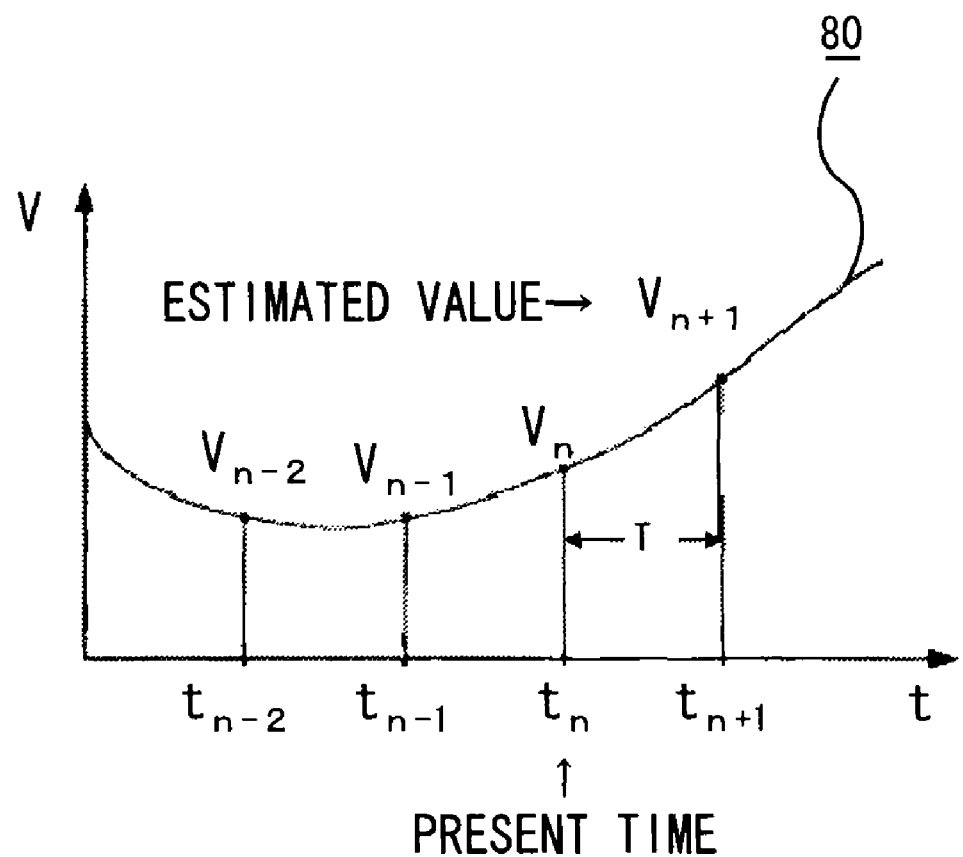
FIG. 2 is a diagram showing an operating principle of detected DC voltage value estimation means of the first embodiment of the present invention.

Referring to FIGS. 1 and 2, the detected DC voltage value estimation means 5 provided in the microcomputer 50 includes a first memory 8 for storing a detected DC voltage value $V_{n-1}$ detected by the voltage sensing means 4 at a sampling time $t_{n-1}$ one sampling cycle before a present sampling time (present time) $t_n$, a second memory 9 for storing a detected DC voltage value $V_{n-2}$ detected at a sampling time $t_{n-2}$ two sampling cycles before the present sampling time $t_n$, an adder 10, a subtracter 11 and a multiplier 12. The working of the adder 10, the subtracter 11 and the multiplier 12 will be described later.

The rectification means 21 of the first embodiment may be either a separately-excited rectification circuit using a diode rectification circuit or a bridge rectification circuit or a self-commutated rectification circuit using a converter which performs pulse-width modulation (PWM) control operation. Also, the power converter 1 has a PWM control portion for controlling the AC rotary machine 2 by outputting a gate signal, for example. No description of the PWM control operation is provided here since the same is a prior art technology. While this embodiment shows an example employing the microcomputer 50 provided with the detected DC voltage value estimation means 5 and the output voltage control means 6, the invention is not limited to this example using the microcomputer 50 but may be any arrangement having an equivalent function.

Described next is an operating principle of the detected DC voltage value estimation means 5 of the first embodiment. Regarding a DC voltage waveform 80 as time series data and expressing the DC voltage waveform 80 by a quadratic function shown in FIG. 2, the detected DC voltage value estimation means 5 estimates a DC voltage estimation value $V_{n+1}$ at a next sampling time $t_{n+1}$ from a detected DC voltage value $V_n$ sampled at the present sampling time (present time) $t_n$, the detected DC voltage value $V_{n-1}$ sampled at the sampling time $t_{n-1}$ one sampling cycle before the present time, and the detected DC voltage value $V_{n-2}$ sampled at the sampling time $t_{n-2}$ two sampling cycles before the present time.

"T" shown in FIG. 2 denotes specific sampling intervals of a period of time which can be arbitrarily set when designing the microcomputer 50. Discussed below is a case where a curve connecting the values $V_{n-2}$ to $V_{n+1}$ in FIG. 2 is expressed by a quadratic function.

Specifically, the DC voltage estimation value $V_{n+1}$ at the next sampling time $t_{n+1}$, the detected DC voltage value $V_n$ at the present sampling time $t_n$, the detected DC voltage value $V_{n-1}$ at the sampling time $t_{n-1}$ one sampling cycle before, and the detected DC voltage value $V_{n-2}$ at the sampling time $t_{n-2}$ two sampling cycles before can be expressed by equations (1) below:

$$V_{n-2}=a(t_{n-2})^2+b(t_{n-2})+c$$

$$V_{n-1}=a(t_{n-2}+T)^2+b(t_{n-2}+T)+c$$

$$V_n=a(t_{n-2}+2T)^2+b(t_{n-2}+2T)+c$$

$$V_{n+1}=a(t_{n-2}+3T)^2+b(t_{n-2}+3T)+c \quad (1)$$

Deleting arbitrary numbers a, b and c as well as $t_{n-2}$ and T from equations (1) above, the DC voltage estimation value $V_{n+1}$ at the next sampling time is calculated as indicated by equation (2) below:

$$V_{n+1}=3(V_n-V_{n-1})+V_{n-2} \qquad (2)$$

The detected DC voltage value estimation means 5 provided in the microcomputer 50 shown in FIG. 1 shows a configuration based on equation (2) above. The working of the detected DC voltage value estimation means 5 is now described with reference to FIG. 1.

The subtracter 11 of the detected DC voltage value estimation means 5 subtracts the detected DC voltage value $V_{n-1}$ detected at the time $t_{n-1}$ one sampling cycle before and stored in the first memory 8 from the detected DC voltage value $V_n$ detected at the present time $t_n$, and the multiplier 12 multiplies an output of the subtracter 11 by a specific constant "3". Then, the adder 10 adds the result of multiplication by the multiplier 12 and the detected DC voltage value $V_{n-2}$ detected at the time $t_{n-2}$ two sampling cycles before and stored in the second memory 9. In short, the detected DC voltage value estimation means 5 carries out a mathematical operation expressed by equation (2) and outputs the result of this operation to the output voltage control means 6 as the DC voltage estimation value at the next sampling time $t_{n+1}$.

The output voltage control means 6 carries out an operation for correcting a modulation factor used in performing pulse-width modulation according to the DC voltage estimation value $V_{n+1}$ at the next sampling time $t_{n+1}$ estimated by the detected DC voltage value estimation means 5.

Figure 3:
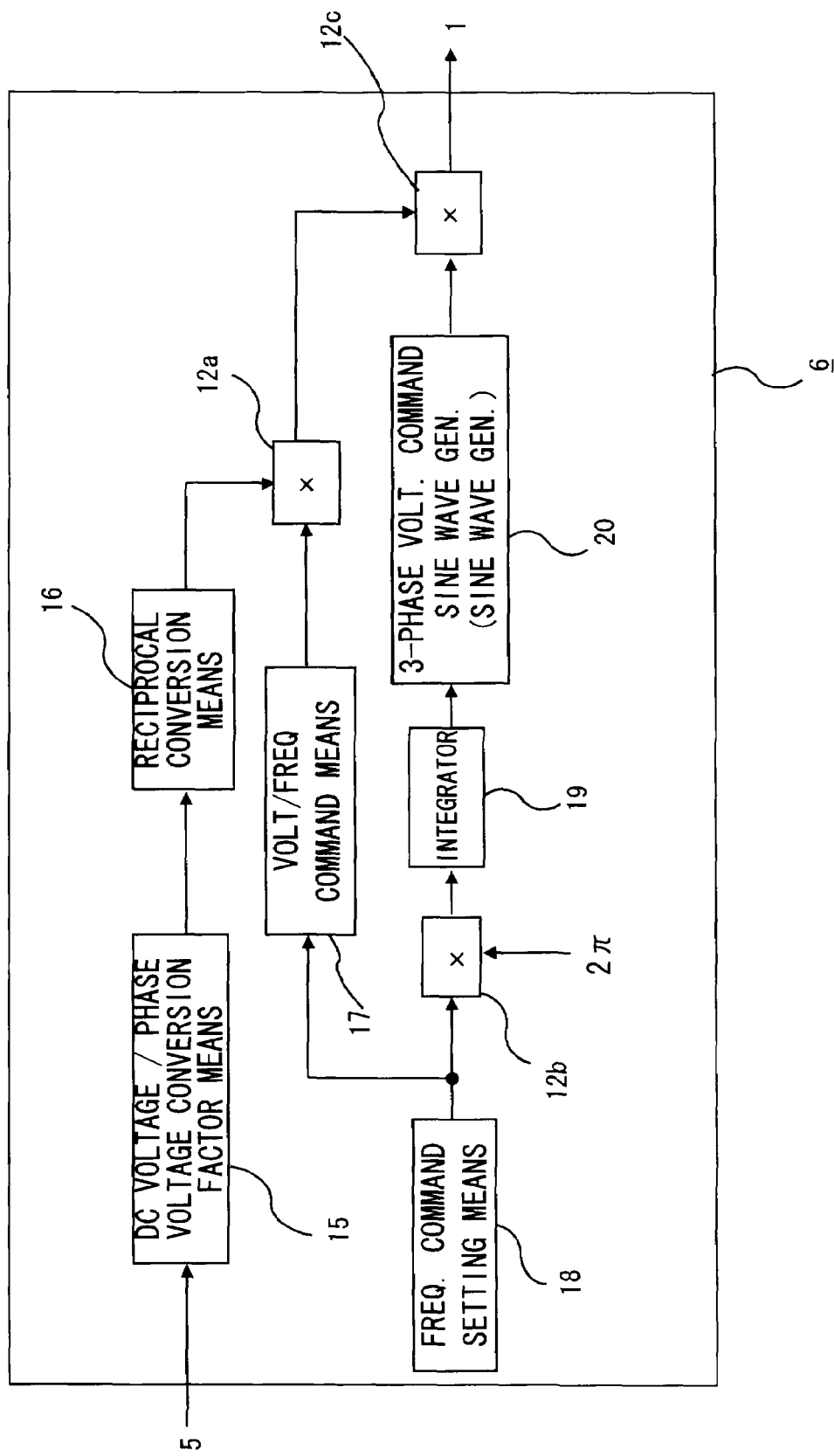
FIG. 3 is a configuration diagram showing output voltage control means of the first embodiment of the present invention.

FIG. 3 is a configuration diagram showing one specific example of the output voltage control means 6. In the output voltage control means 6 of FIG. 3, the DC voltage estimation value $V_{n+1}$ estimated by the detected DC voltage value estimation means 5 is converted into a value corresponding to a phase voltage by DC voltage/phase voltage conversion factor means 15 and this value is converted into a value corresponding to a reciprocal by reciprocal conversion means 16. The value obtained by conversion by the reciprocal conversion means 16 is multiplied by a value of a voltage command obtained by voltage/frequency command means 17 according to a frequency command set by frequency command setting means 18 by a multiplier 12a to thereby calculate the modulation factor used in performing pulse-width modulation. Estimating the DC voltage by using this modulation factor, the output voltage control means 6 corrects the output voltage of the power converter 1 in order to reduce pulsation of the output voltage of the power converter 1. According to the frequency command set by the frequency command setting means 18, an integrator 19 integrates values multiplied by $2\pi$ by a multiplier 12b to determine a phase and, according to this phase, a sine wave representative of a three-phase voltage command is generated by a three-phase voltage command sine wave generator 20. Then, a value obtained by multiplying the three-phase voltage command sine wave by the modulation factor used for pulse-width modulation output from the multiplier 12a by a multiplier 12c, or an output voltage command value, is output to the PWM control portion of the power converter 1. A beat phenomenon of an output current of the power converter 1 is suppressed by driving the power converter 1 by the aforementioned PWM control operation. While the output voltage control means 6 of the aforementioned configuration has been discussed as an example in the first embodiment, it is also possible to achieve the same effect by using output voltage control means based on another high-performance method, such as vector control.

Figure 4:
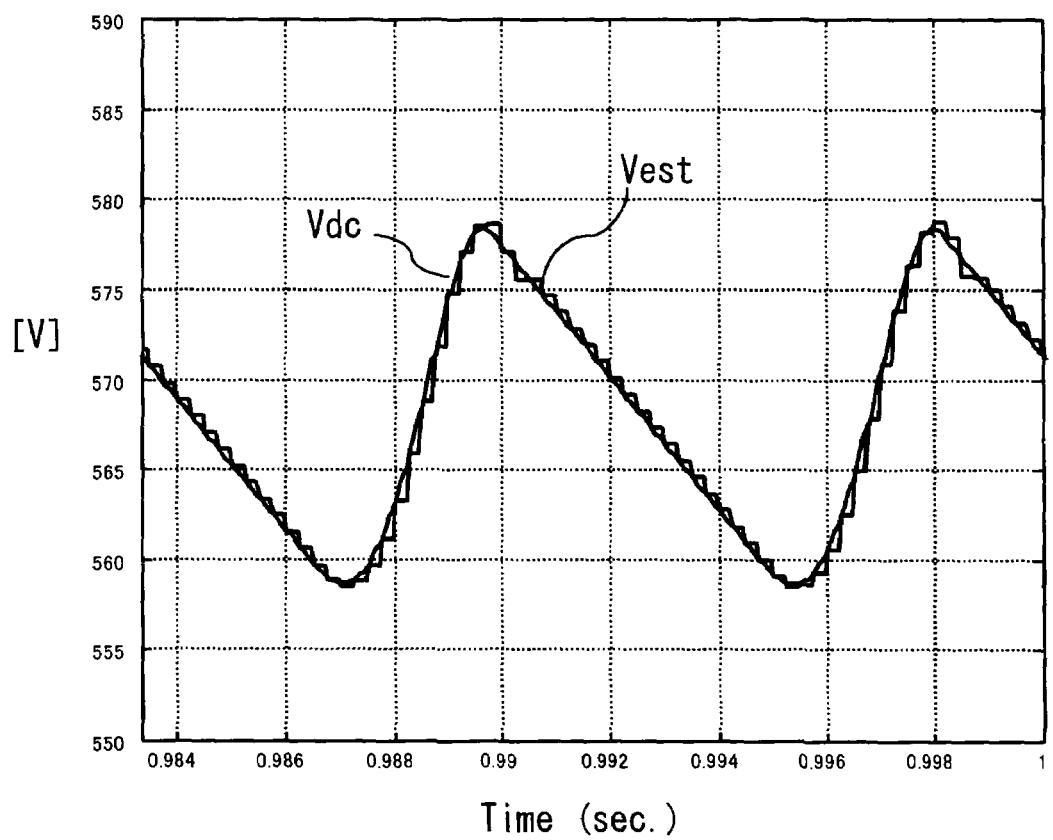
FIG. 4 is a diagram showing the result of estimation of DC voltage estimation values and an actually measured DC voltage waveform according to the first embodiment of the present invention.

Shown in FIG. 4 are the result of estimation of DC voltage estimation values $V_{n+1}$ and an actually measured DC voltage waveform. As can been seen from FIG. 4, the DC voltage estimation value ("Vest" in FIG. 4) generally matches the actually measured DC voltage waveform ("Vdc" in FIG. 4) and this makes it possible to control more strictly compared to the prior art. It is to be noted that the actual DC voltage waveform Vdc is a DC voltage waveform observed when the DC voltage is obtained under conditions where a single-phase AC voltage supplied from a power source is rectified by a single-phase diode rectification circuit. As will be recognized from the DC voltage waveform of FIG. 4, a pulsation component of the DC voltage obtained from the single-phase diode rectification circuit does not exhibit a sine wave but is almost like a sawtooth wave and the frequency of the pulsation component becomes twice the frequency of the source voltage. Therefore, in the case of a 60 Hz single-phase power supply, the pulsation component has a frequency of 120 Hz. Shown in FIG. 4 is the result obtained with the sampling intervals of a period set at 250 μs. While the AC power supply 22 of the first embodiment is a single-phase power supply, it is needless to mention that the same effect is obtained even when a three-phase power supply is substituted for this single-phase power supply.

As thus far discussed, the power converting apparatus 100 of this first embodiment detects the DC voltage output from the rectification means 21 by the voltage sensing means 4, inputs the detected DC voltage value thus detected into the detected DC voltage value estimation means 5 provided in the microcomputer 50 at the arbitrarily set specific intervals of a period T, performs the mathematical operation expressed by equation (2) shown earlier, and corrects the pulse-width modulation factor of the power converter 1 according to the DC voltage estimation value $V_{n+1}$ at the next sampling time $t_{n+1}$. It is therefore possible to sufficiently suppress the output voltage pulsation caused by the pulsation component of the DC voltage and thereby reduce the beat phenomenon of the output current as well.

In a conventional microcomputer control approach, a control signal output from a microcomputer is reflected in a power converter with a delay of one sampling cycle after detection of the DC voltage, so that the output voltage pulsation can not be suppressed sufficiently.

In this first embodiment, however, detected DC voltage values at sampling times one and two sampling cycles before the present time are detected by the detected DC voltage value estimation means 5 provided in the microcomputer 50 at the specific sampling intervals and the DC voltage estimation value $V_{n+1}$ at the next sampling time $t_{n+1}$ is estimated by regarding the DC voltage waveform 80 formed by connecting these values as a quadratic function, so that the aforementioned drawback of the conventional microcomputer control approach caused by the one sampling cycle control delay is overcome.

Second Embodiment

A second embodiment discussed here is intended to restrict the sampling intervals of the period T of DC voltage detection by the microcomputer 50 provided in the power converting apparatus 100. Specifically, the sampling period T is set in such a manner that a value obtained by dividing the reciprocal of the sampling period T by the frequency of the pulsation component becomes 10 or above. With this arrangement, it is possible to ensure a high degree of DC voltage estimation accuracy.

In this connection, it has been found that, if the value obtained by dividing the reciprocal of the sampling period T by the frequency of the pulsation component equals 10 or less, it becomes difficult to correct the output voltage of the power converter 1 in order to reduce pulsation of the output voltage of the power converter 1 by estimating the DC voltage and, thus, it is impossible to suppress the beat phenomenon of the output current of the power converter 1.

Expressing the sampling intervals of the time period by T (sec.) and the frequency of the pulsation component contained in the DC voltage by f (Hz), a value obtained by dividing the reciprocal of the sampling period T (sec.) by the frequency f (Hz) of the pulsation component contained in the DC voltage is assumed to fall within a range of 10 to 1667 as shown below:

$$10 \leq 1/T/f \leq 1667$$

Figure 5:
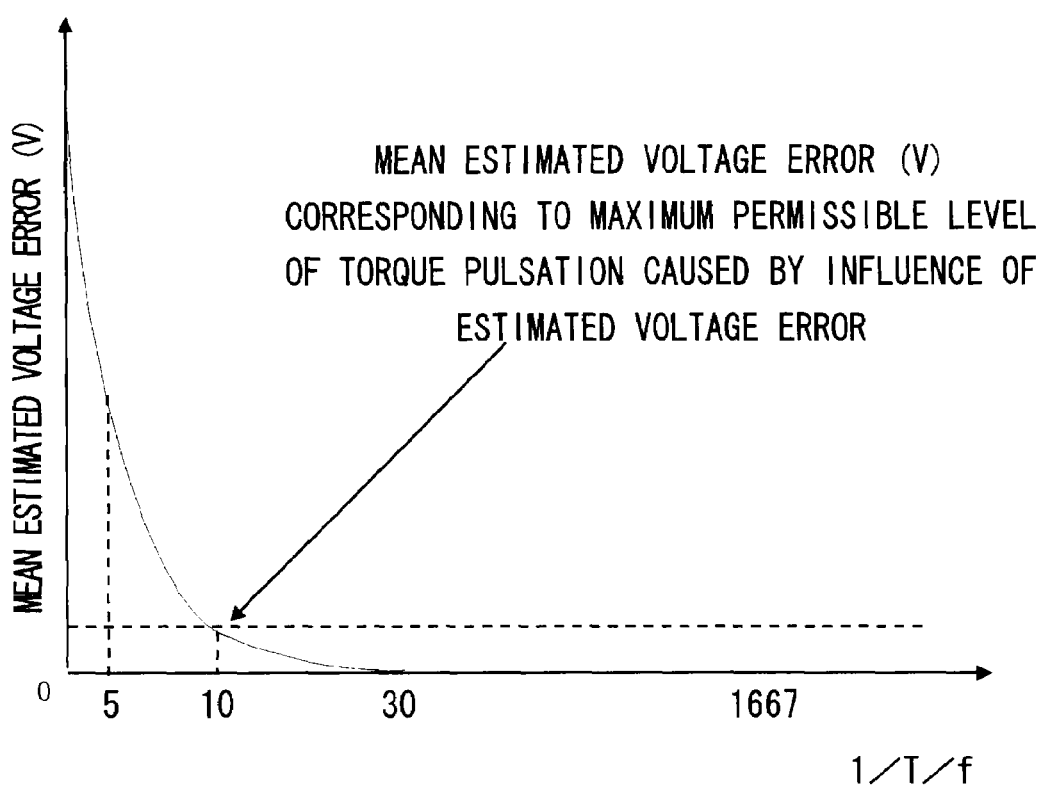
FIG. 5 is a diagram showing sampling intervals and mean estimated voltage errors according to a second embodiment of the present invention.

Presumably, this is based on the below-described grounds. A mean error of pulsation components at different frequencies contained in the DC voltage is calculated by using the following definition: (estimated voltage error)=(actual DC voltage Vdc)−(DC voltage estimation value of this invention). FIG. 5 shows the result of mean error calculation, the horizontal axis indicating the value of 1/T/f obtained by dividing the reciprocal of the sampling period T (sec.) by the frequency f (Hz) of the pulsation component contained in the DC voltage and the vertical axis indicating the mean value of estimated voltage errors at different frequencies of pulsation components contained in the DC voltage. It is appreciated from FIG. 5 that a point where the value obtained by dividing the reciprocal of the sampling period T (sec.) by the frequency f (Hz) of the pulsation component contained in the DC voltage is 10 (shown by an arrow in FIG. 5) indicates a maximum permissible level of pulsation of torque output by the AC rotary machine 2, for example, caused by influence of the estimated voltage error.

Figure 6:
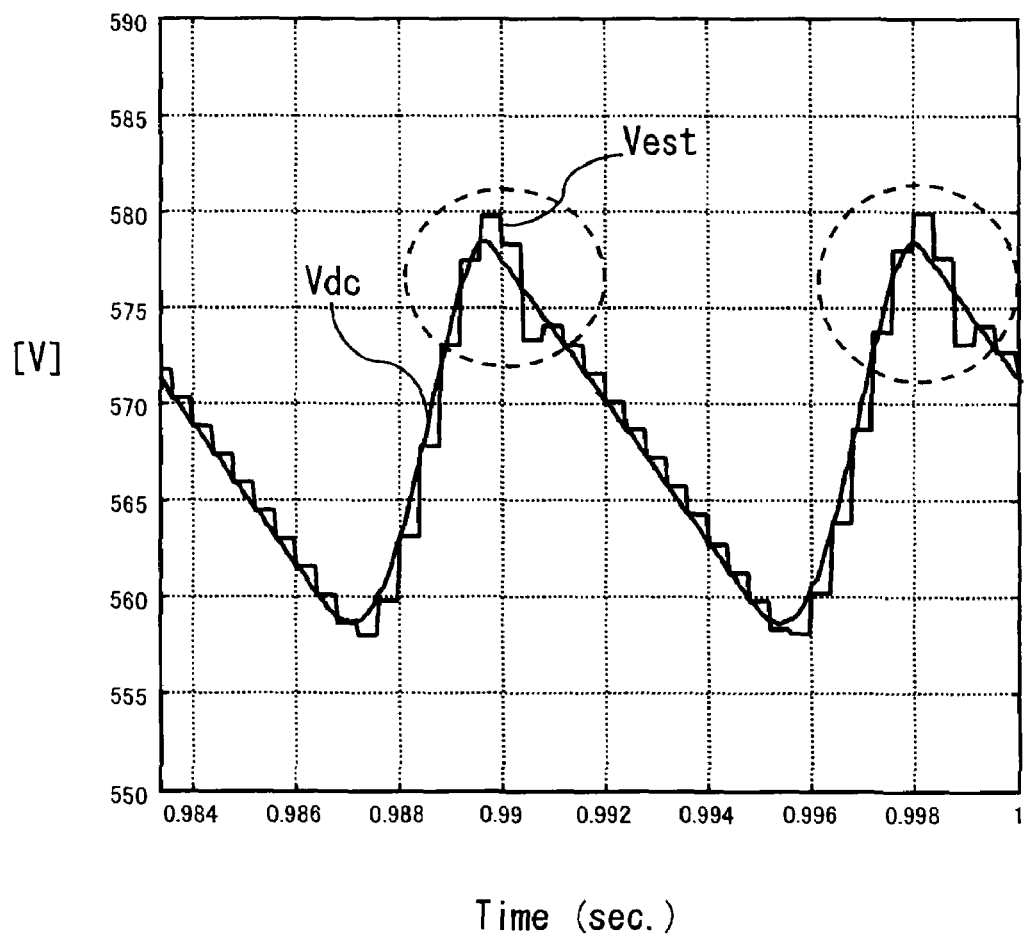
FIG. 6 is a diagram showing a referential example indicating the result of estimation of DC voltage estimation values and an actually measured DC voltage waveform.
Figure 7:
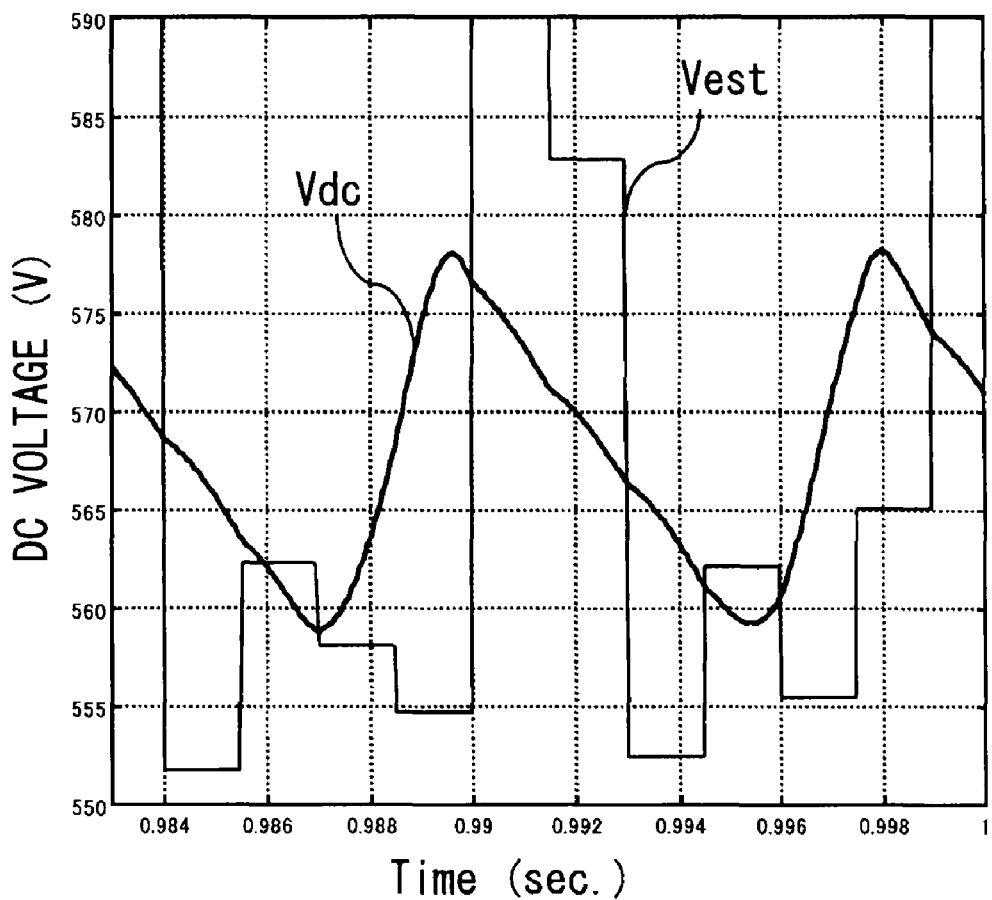
FIG. 7 is a diagram showing another referential example indicating the result of estimation of DC voltage estimation values and an actually measured DC voltage waveform.

In FIG. 4 showing the result of estimation of DC voltage estimation values $V_{n+1}$ and the actually measured DC voltage waveform according to the first embodiment, the sampling period T was 250 μs and the pulsation component of the DC voltage was 120 Hz as previously mentioned. To permit comparison with FIG. 4 of the foregoing first embodiment, FIG. 6 shows just for reference the actual DC voltage waveform Vdc and the DC voltage estimation value Vest obtained when the frequency of the pulsation component of the DC voltage is f=120 Hz and the time period is T=250 μs, that is, when the value obtained by dividing the reciprocal of the sampling period T by the frequency f of the pulsation component contained in the DC voltage is approximately 10. It is possible to ascertain that, as shown in FIG. 6, when the value obtained by dividing the reciprocal of the sampling period T by the frequency f of the pulsation component contained in the DC voltage is approximately 10, the DC voltage estimation value Vest has a greater error at around peaks of the DC voltage as compared to the DC voltage waveform Vdc. Also, FIG. 7 shows just for reference the result of simulation (DC voltage waveform Vdc, DC voltage estimation value Vest) obtained when the sampling intervals are 1.67 ms and the frequency of the pulsation component is 120 Hz.

As discussed in the foregoing, the second embodiment provides the power converting apparatus 100 having the arrangement for restricting the sampling intervals within a specific range in addition to the earlier-described arrangement of the foregoing first embodiment. For this reason, the second embodiment produces such an effect that the DC voltage estimation value does not greatly deviate from a true DC voltage value at around amplitude peaks of the varying DC voltage and, therefore, the output current of the power converter 1 does not greatly fluctuate at the amplitude peaks, making it possible to reduce the occurrences of the beat phenomenon.

Third Embodiment

Figure 8:
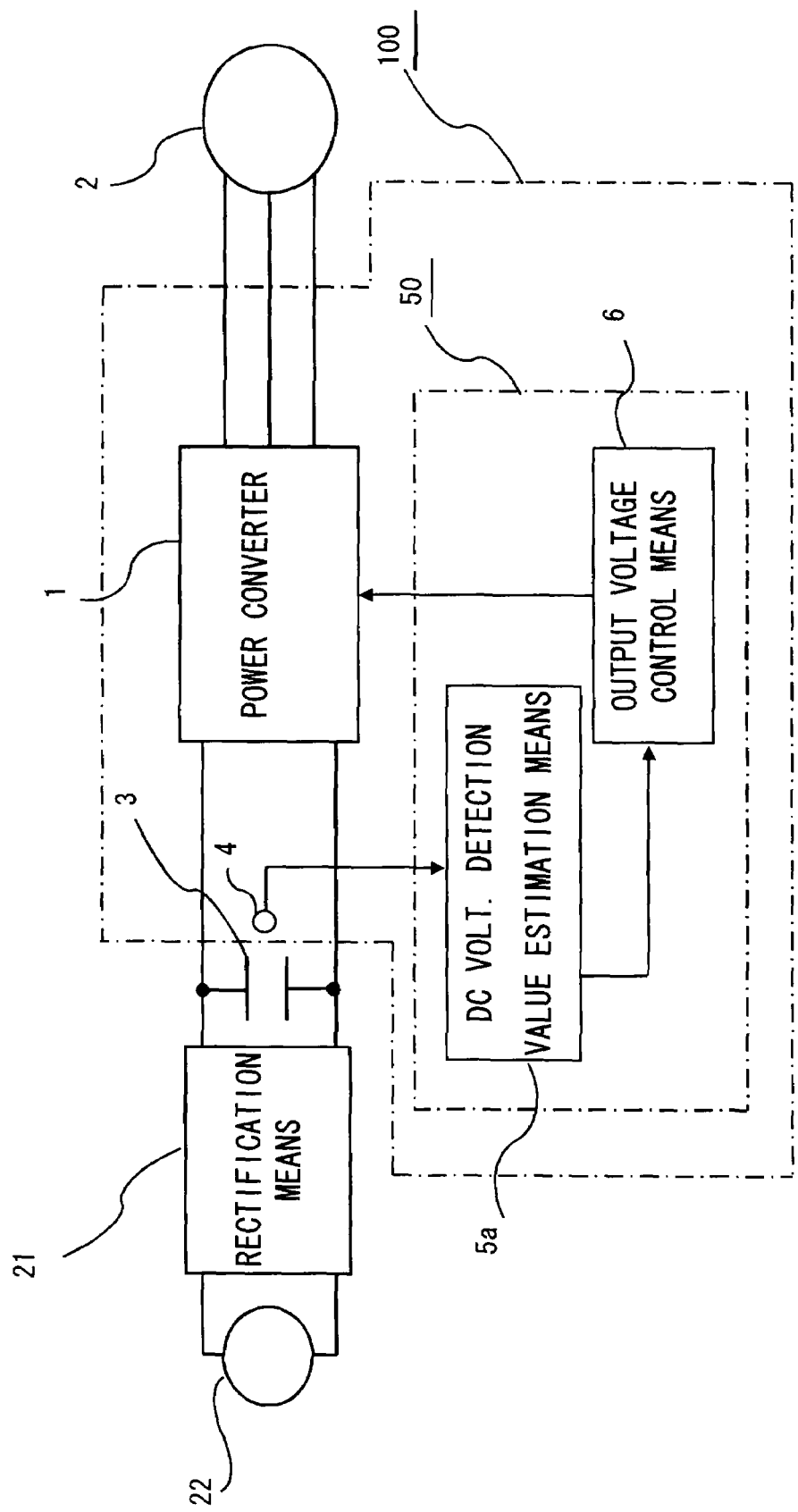
FIG. 8 is a block diagram showing a power converting apparatus according to a third embodiment of the present invention.

FIG. 8 is a block diagram showing the configuration of a power converting apparatus 100 according to a third embodiment of the present invention.

FIG. 8 differs from FIG. 1 of the foregoing first embodiment only in that a detected DC voltage value estimation means 5a has a different configuration. Thus, the detected DC voltage value estimation means 5a shown in FIG. 8 is described hereinbelow.

An operating principle of the detected DC voltage value estimation means 5a of the third embodiment is as follows. Regarding a DC voltage waveform as time series data and expressing the DC voltage waveform by a cubic function, the detected DC voltage value estimation means 5a estimates a DC voltage estimation value $V_{n+1}$ at a next sampling time $t_{n+1}$ from a detected DC voltage value $V_n$ at a present sampling time (present time) $t_n$, a detected DC voltage value $V_{n-1}$ at a sampling time $t_{n-1}$ one sampling cycle before, a detected DC voltage value $V_{n-2}$ at a sampling time $t_{n-2}$ two sampling cycles before, and a detected DC voltage value $V_{n-3}$ at a sampling time $t_{n-3}$ three sampling cycles before. Here, "T" denotes specific sampling intervals of the time period and a curve connecting the values $V_{n-3}$ to $V_{n+1}$ is expressed by a cubic function. In this case, a relationship among the DC voltage estimation value $V_{n+1}$ at the next sampling time $t_{n+1}$, the detected DC voltage value $V_n$ sampled at the present time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, and the detected DC voltage value $V_{n-3}$ at the sampling time $t_{n-3}$ three sampling cycles before can be expressed by equations (3) below:

$$V_{n-3}=a(t_{n-3})^3+b(t_{n-3})^2+c(t_{n-3})+d$$

$$V_{n-2}=a(t_{n-3}+T)^3+b(t_{n-3}+T)^2+c(t_{n-3}+T)+d$$

$$V_{n-1}=a(t_{n-3}+2T)^3+b(t_{n-3}+2T)^2+c(t_{n-3}+2T)+d$$

$$V_n=a(t_{n-3}+3T)^3+b(t_{n-3}+3T)^2+c(t_{n-3}+3T)+d$$

$$V_{n+1}=a(t_{n-3}+4T)+b(t_{n-3}+4T)^2+c(t_{n-3}+4T)+d \quad (3)$$

Deleting arbitrary numbers a, b, c and d as well as $t_{n-3}$ and the sampling intervals of the period T from equations (3) above, the DC voltage estimation value $V_{n+1}$ at the next sampling time is calculated as indicated by equation (4) below:

$$V_{n+1}=4(V_n+V_{n-2})-6V_{n-1}-V_{n-3} \quad (4)$$

Figure 9:
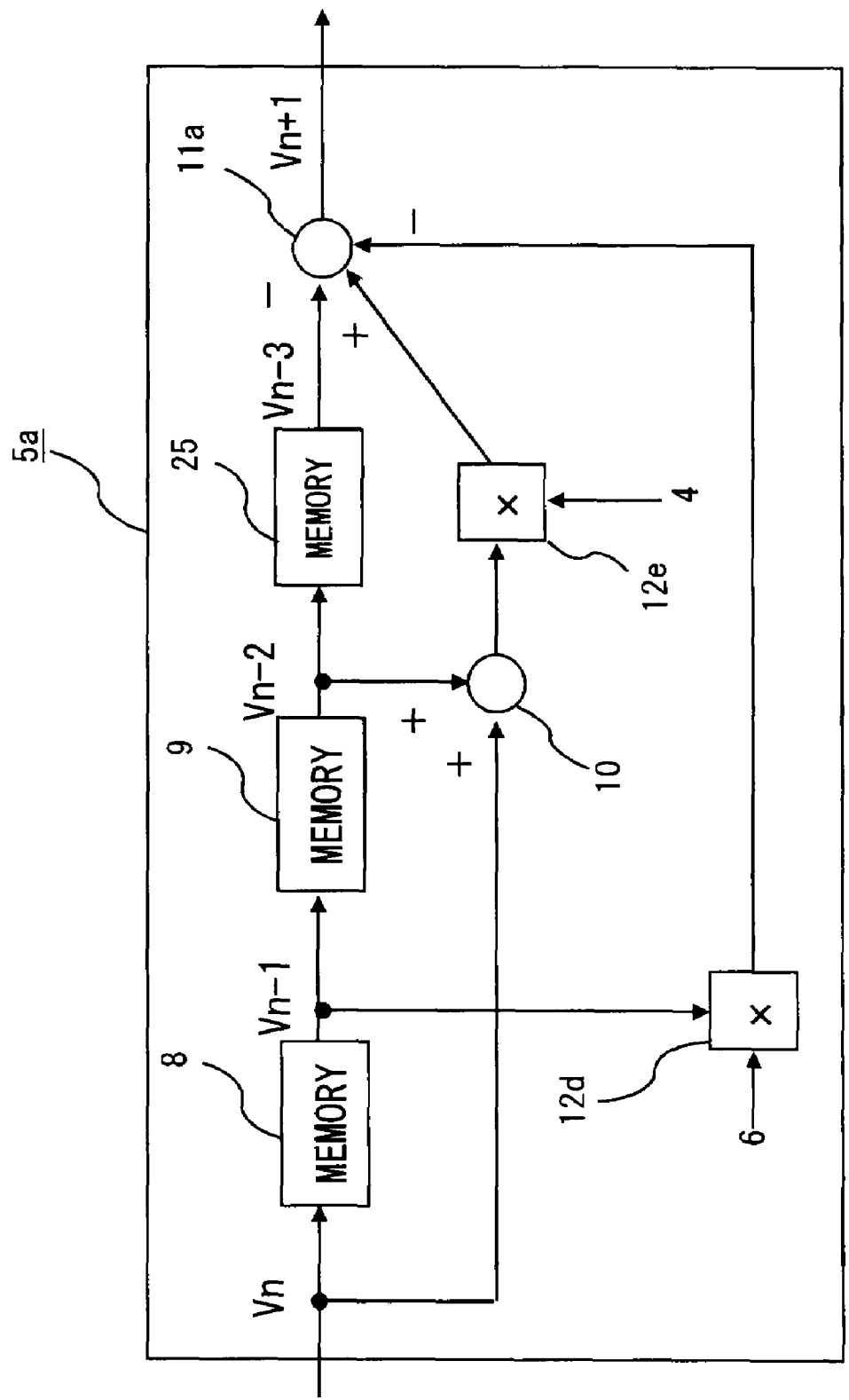
FIG. 9 is a block diagram showing detected DC voltage value estimation means of the third embodiment of the present invention.

Shown in FIG. 9 in the form of a block diagram is the configuration of the detected DC voltage value estimation means 5a for carrying out a mathematical operation expressed by equation (4).

The detected DC voltage value estimation means 5a of FIG. 9 includes a first memory 8 capable of storing the detected DC voltage value $V_{n-1}$ detected at the sampling time $t_{n-1}$ one sampling cycle before, a second memory 9 capable of storing the detected DC voltage value $V_{n-2}$ detected at the sampling time $t_{n-2}$ two sampling cycles before, and a third memory 25 capable of storing the detected DC voltage value $V_{n-3}$ detected at the sampling time $t_{n-3}$ three sampling cycles before.

Then, using an adder 10, an adder/subtracter 11a and multipliers 12d, 12e of FIG. 9, the detected DC voltage value estimation means 5a estimates the DC voltage estimation value $V_{n+1}$ at the next sampling time $t_{n+1}$ based on the detected DC voltage value $V_{n-1}$ detected at the sampling time $t_{n-1}$ one sampling cycle before and stored in the first memory 8, the detected DC voltage value $V_{n-2}$ detected at the sampling time $t_{n-2}$ two sampling cycles before and stored in the second memory 9, the detected DC voltage value $V_{n-3}$ detected at the sampling time $t_{n-3}$ three sampling cycles before and stored in the third memory 25, and the detected DC voltage value $V_n$ detected at the present sampling time $t_n$. As a result, it is possible to estimate the DC voltage estimation value $V_{n+1}$ at the next sampling time $t_{n+1}$ based on equation (4).

Compared to the aforementioned estimation method of the first embodiment, the third embodiment produces such an effect that a more precise estimation result can be obtained with the addition of the detected DC voltage value $V_{n-3}$ at the sampling time $t_{n-3}$ three sampling cycles before.

Figure 10:
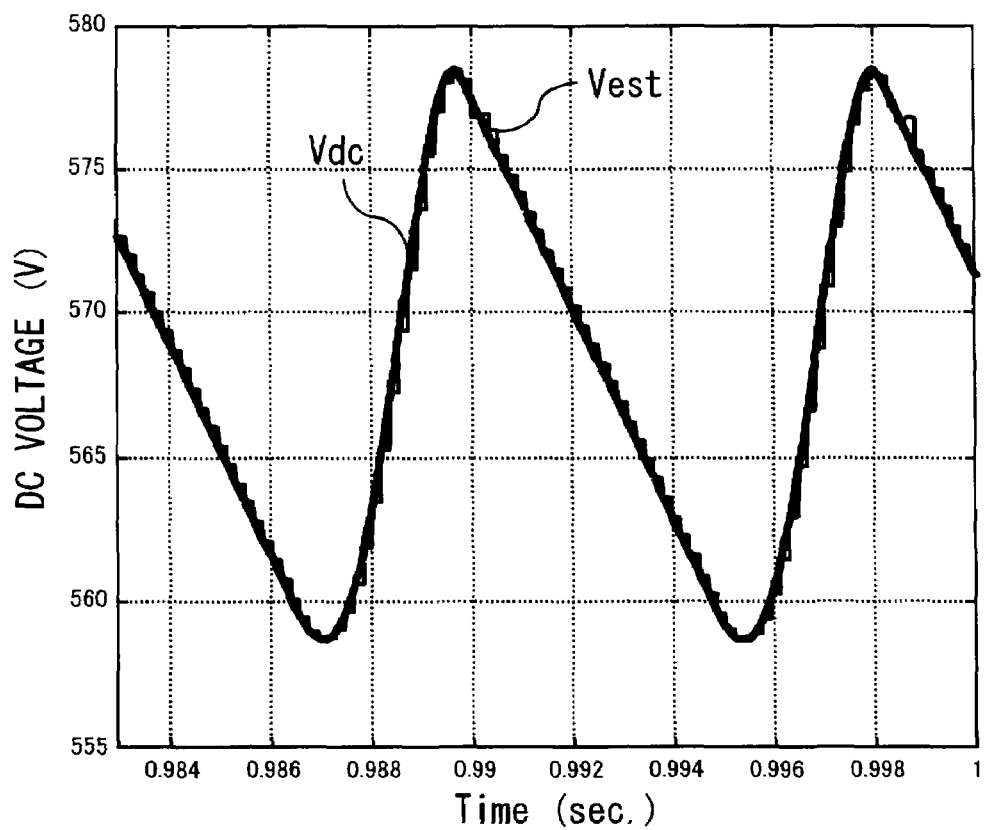
FIG. 10 is a diagram showing the result of estimation of DC voltage estimation values and an actually measured DC voltage waveform according to the third embodiment of the present invention.

FIG. 10 shows a relationship between DC voltage estimation values Vest given by the detected DC voltage value estimation means 5a of the third embodiment and an actual DC voltage waveform Vdc, wherein the actual DC voltage waveform Vdc of FIG. 10 is a DC voltage waveform determined when the DC voltage is obtained by rectifying an AC source voltage by a single-phase diode rectification circuit. As will be recognized from the DC voltage waveform of FIG. 10, a pulsation component of the DC voltage obtained from the single-phase diode rectification circuit does not exhibit a sine wave but is almost like a sawtooth wave and the frequency of the pulsation component becomes twice the frequency of the source voltage. Therefore, in the case of a 60 Hz single-phase power supply, the pulsation component has a frequency of 120 Hz. Shown in FIG. 10 is the result of operation of the detected DC voltage value estimation means 5a obtained with the sampling intervals of the period T set at 180 μs.

Fourth Embodiment

Figure 11:
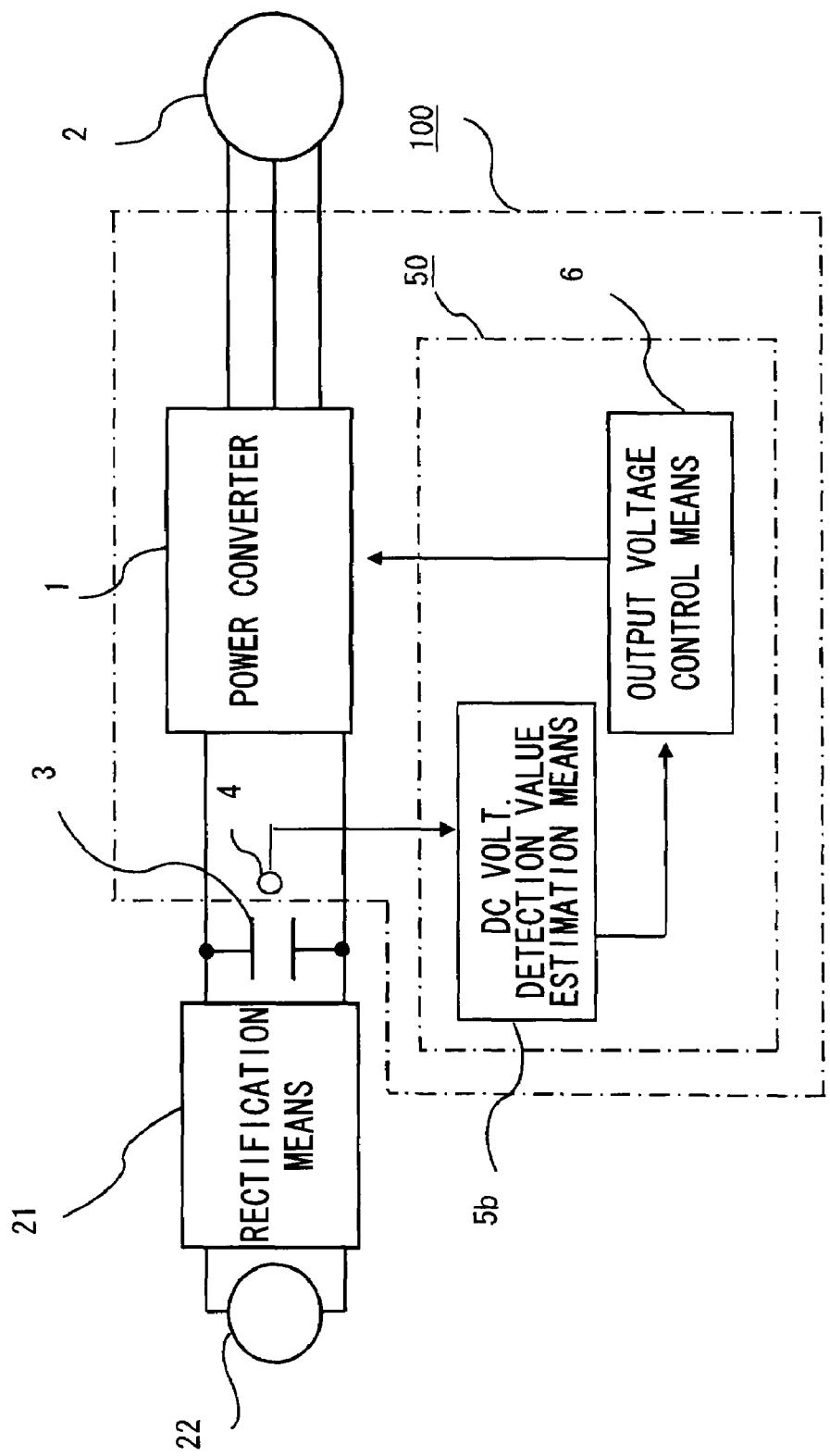
FIG. 11 is a block diagram showing a power converting apparatus according to a fourth embodiment of the present invention.

FIG. 11 is a block diagram showing an example of the configuration of a power converting apparatus 100 according to a fourth embodiment of the present invention.

Figure 12:
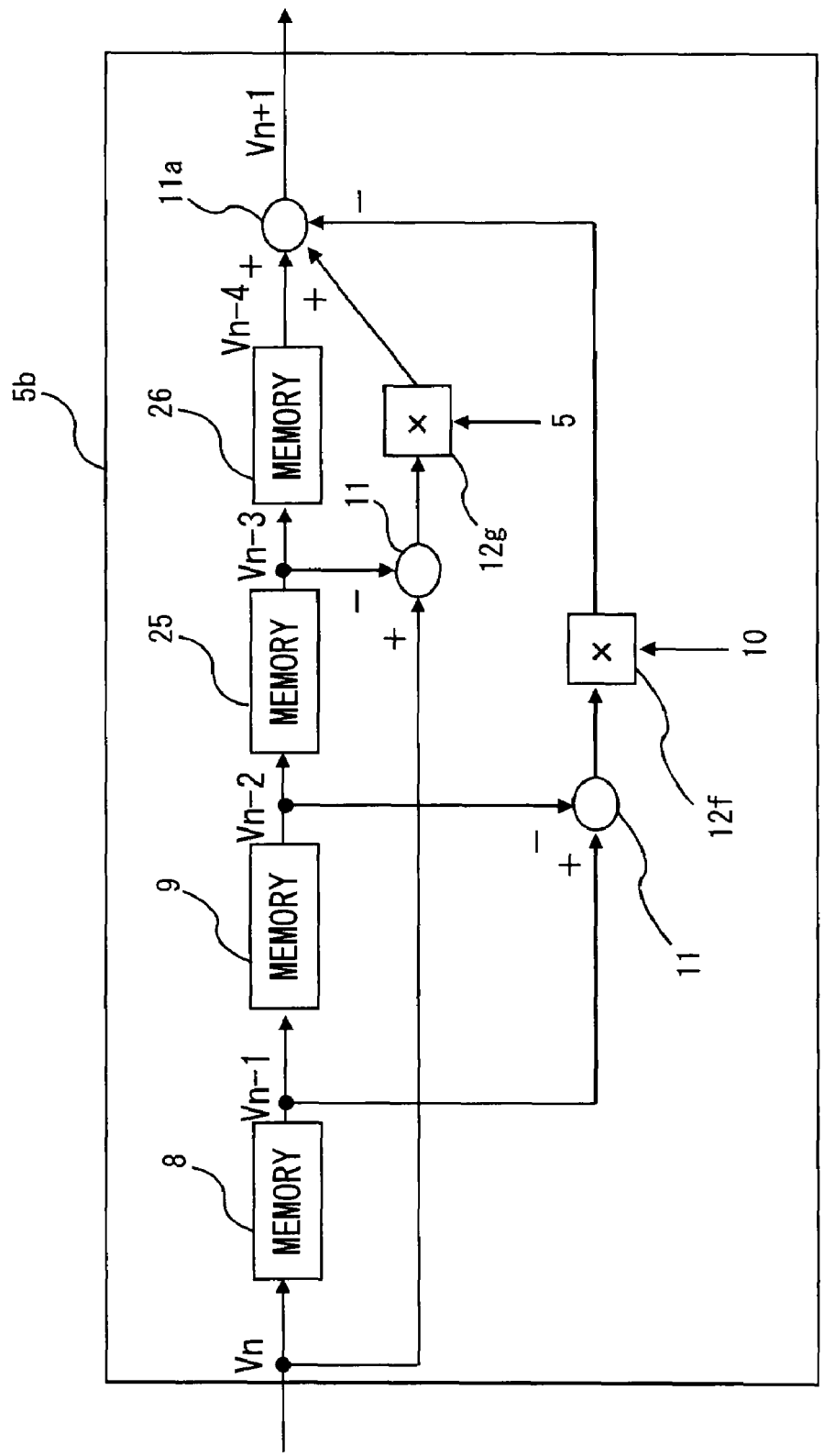
FIG. 12 is a block diagram showing detected DC voltage value estimation means of the fourth embodiment of the present invention.

FIG. 11 differs from FIG. 1 of the foregoing first embodiment only in that a detected DC voltage value estimation means 5b has a different configuration. Thus, the detected DC voltage value estimation means 5b shown in FIG. 12 is described hereinbelow.

An operating principle of the detected DC voltage value estimation means 5b of the fourth embodiment is as follows. Regarding a DC voltage waveform as time series data and expressing the DC voltage waveform by a quartic function, the detected DC voltage value estimation means 5b estimates a DC voltage estimation value $V_{n+1}$ at a next sampling time $t_{n+1}$ from a detected DC voltage value $V_n$ at a present sampling time (present time) $t_n$, a detected DC voltage value $V_{n-1}$ at a sampling time $t_{n-1}$ one sampling cycle before, a detected DC voltage value $V_{n-2}$ at a sampling time $t_{n-2}$ two sampling cycles before, a detected DC voltage value $V_{n-3}$ at a sampling time $t_{n-3}$ three sampling cycles before, and a detected DC voltage value $V_{n-4}$ at a sampling time $t_{n-4}$ four sampling cycles before. Here, "T" denotes specific sampling intervals and a curve connecting the values $V_{n-4}$ to $V_{n+1}$ is expressed by a quartic function. Specifically, the DC voltage estimation value $V_{n+1}$ at the next sampling time $t_{n+1}$, the detected DC voltage value $V_n$ sampled at the present time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, the detected DC voltage value $V_{n-3}$ at the sampling time $t_{n-3}$ three sampling cycles before, and the detected DC voltage value $V_{n-4}$ at the sampling time $t_{n-4}$ four sampling cycles before can be expressed by equations (5) below:

$$V_{n-4}=a(t_{n-4})^4+b(t_{n-3})^3+c(t_{n-4})^2+d(t_{n-4})+e$$

$$V_{n-3}=a(t_{n-4}+T)^4+b(t_{n-4}+T)^3+c(t_{n-4}+T)^2+d(t_{n-4}+T)+e$$

$$V_{n-2}=a(t_{n-4}+2T)^4+b(t_{n-4}+2T)^3+c(t_{n-4}+2T)^2+d(t_{n-4}+2T)+e$$

$$V_{n-1}=a(t_{n-4}+3T)^4+b(t_{n-4}+3T)^3+c(t_{n-4}+3T)^2+d(t_{n-4}+3T)+e$$

$$V_n=a(t_{n-4}+4T)^4+b(t_{n-4}+4T)^3+c(t_{n-4}+4T)^2+d(t_{n-4}+4T)+e$$

$$V_{n+1}=a(t_{n-4}+5T)^4+b(t_{n-4}+5T)^3+c(t_{n-4}+5T)^2+d(t_{n-4}+5T)+e \quad (5)$$

Deleting arbitrary numbers a, b, c, d and e as well as $t_{n-4}$ and the sampling intervals of the period T from equations (5) above, the DC voltage value $V_{n+1}$ at the next sampling time is calculated as indicated by equation (6) below:

$$V_{n+1}=5(V_n-V_{n-3})-10(V_{n-1}-V_{n-2})+V_{n-4} \quad (6)$$

Shown in FIG. 12 in the form of a block diagram is the configuration of the detected DC voltage value estimation means 5a for carrying out a mathematical operation expressed by equation (6).

The detected DC voltage value estimation means 5b of FIG. 12 includes a first memory 8 capable of storing the detected DC voltage value $V_{n-1}$ detected at the sampling time $t_{n-1}$ one sampling cycle before, a second memory 9 capable of storing the detected DC voltage value $V_{n-2}$ detected at the sampling time $t_{n-2}$ two sampling cycles before, a third memory 25 capable of storing the detected DC voltage value $V_{n-3}$ detected at the sampling time $t_{n-3}$ three sampling cycles before, and a fourth memory 26 capable of storing the detected DC voltage value $V_{n-4}$ detected at the sampling time $t_{n-4}$ four sampling cycles before.

Then, using an adder 11, an adder/subtracter 11a and multipliers 12f, 12g of FIG. 12, the detected DC voltage value estimation means 5b estimates the DC voltage estimation value $V_{n+1}$ at the next sampling time $t_{n+1}$ based on the detected DC voltage value $V_{n-1}$ detected at the sampling time $t_{n-1}$ one sampling cycle before and stored in the first memory 8, the detected DC voltage value $V_{n-2}$ detected at the sampling time $t_{n-2}$ two sampling cycles before and stored in the second memory 9, the detected DC voltage value $V_{n-3}$ detected at the sampling time $t_{n-3}$ three sampling cycles before and stored in the third memory 25, the detected DC voltage value $V_{n-4}$ detected at the sampling time $t_{n-4}$ four sampling cycles before and stored in the fourth memory 26, and the detected DC voltage value $V_n$ detected at the present sampling time $t_n$. As a result, it is possible to estimate the DC voltage estimation value $V_{n+1}$ at the next sampling time $t_{n+1}$ based on equation (6).

Compared to the aforementioned estimation method of the third embodiment, the fourth embodiment produces such an effect that a more precise estimation result can be obtained with the addition of the detected DC voltage value $V_{n-4}$ at the sampling time $t_{n-4}$ four sampling cycles before.

Figure 13:
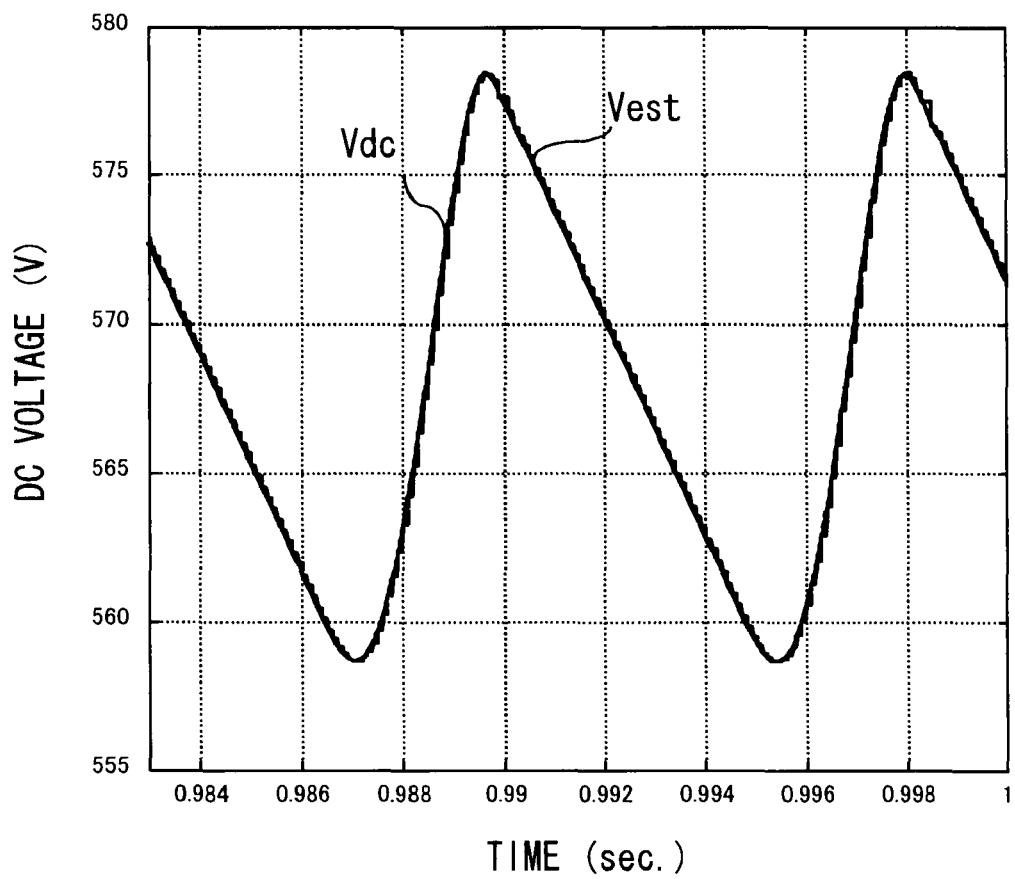
FIG. 13 is a diagram showing the result of estimation of DC voltage estimation values and an actually measured DC voltage waveform according to the fourth embodiment of the present invention.

FIG. 13 shows a relationship between DC voltage estimation values Vest given by the detected DC voltage value estimation means 5b of the fourth embodiment and an actual DC voltage waveform Vdc, wherein the actual DC voltage waveform Vdc of FIG. 13 is a DC voltage waveform determined when the DC voltage is obtained by rectifying an AC source voltage by a single-phase diode rectification circuit. As will be recognized from the DC voltage waveform of FIG. 13, a pulsation component of the DC voltage obtained from the single-phase diode rectification circuit does not exhibit a sine wave but is almost like a sawtooth wave and the frequency of the pulsation component becomes twice the frequency of the source voltage. Therefore, in the case of a 60 Hz single-phase power supply, the pulsation component has a frequency of 120 Hz. Shown in FIG. 13 is the result of operation of the detected DC voltage value estimation means 5b obtained with the sampling intervals of the period T set at 100 μs.

Fifth Embodiment

Figure 14:
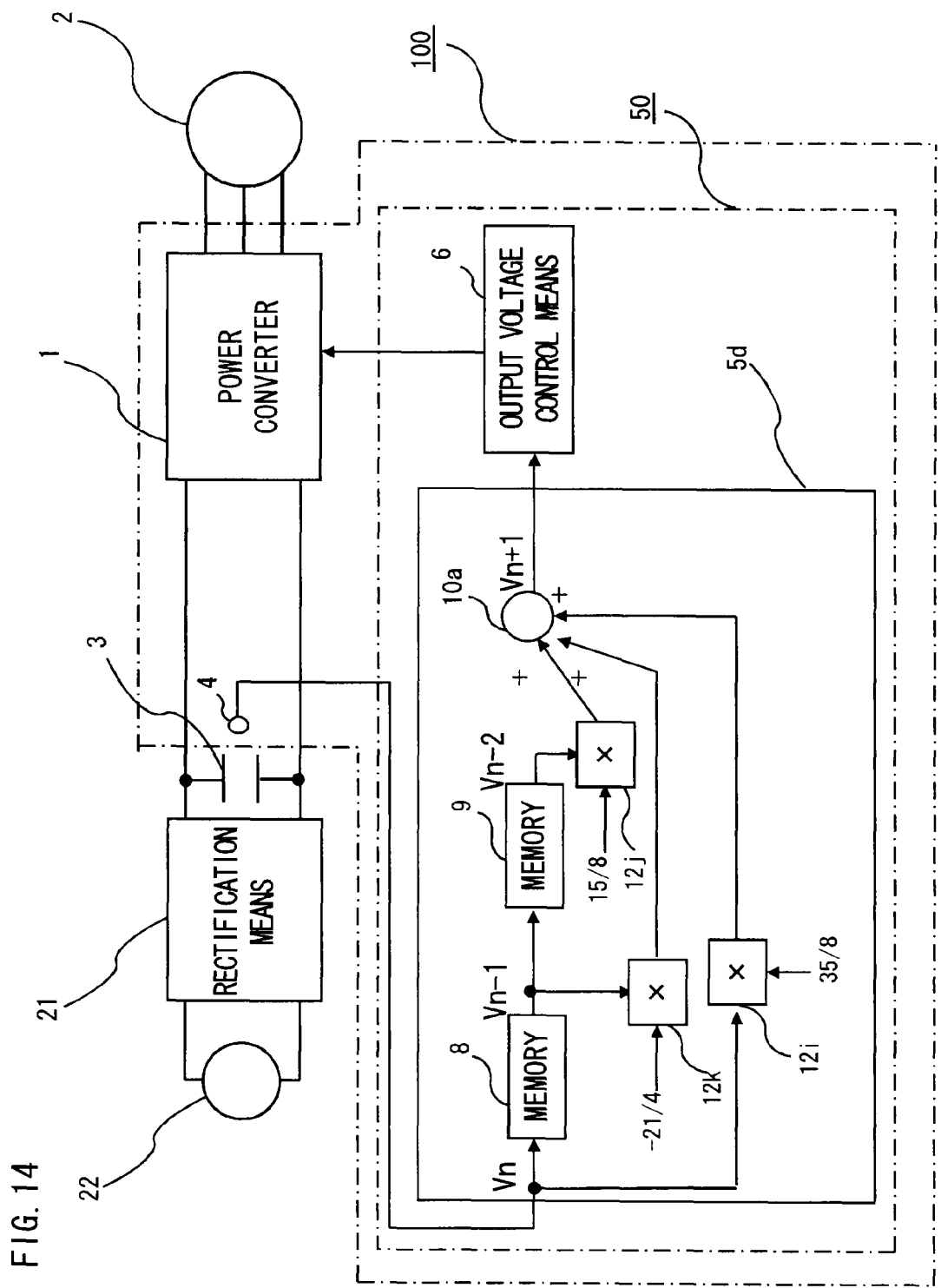
FIG. 14 is a block diagram showing a power converting apparatus according to a fifth embodiment of the present invention.

FIG. 14 is a block diagram showing the configuration of a power converting apparatus 100 according to a fifth embodiment of the present invention.

FIG. 14 differs from FIG. 1 of the first embodiment only in that a detected DC voltage value estimation means 5d has a different configuration. Thus, the detected DC voltage value estimation means 5d shown in FIG. 14 is described hereinbelow.

The power converting apparatus 100 of the fifth embodiment is configured to overcome a drawback concerning not only a delay in sampling cycle control but also a delay of the power converter, that is, a delay from a point in time when the output voltage control means 6 sends a voltage command to a point in time when a switching device of the power converter 1 operates, causing the power converter 1 to apply a voltage to the AC rotary machine 2. In other words, it becomes possible to sufficiently suppress pulsation of an output voltage caused by a pulsation component of the DC voltage and thereby reduce the beat phenomenon of an output current as compared to the first embodiment by taking into consideration the delay of the power converter in addition to the delay in sampling cycle control.

Figure 15:
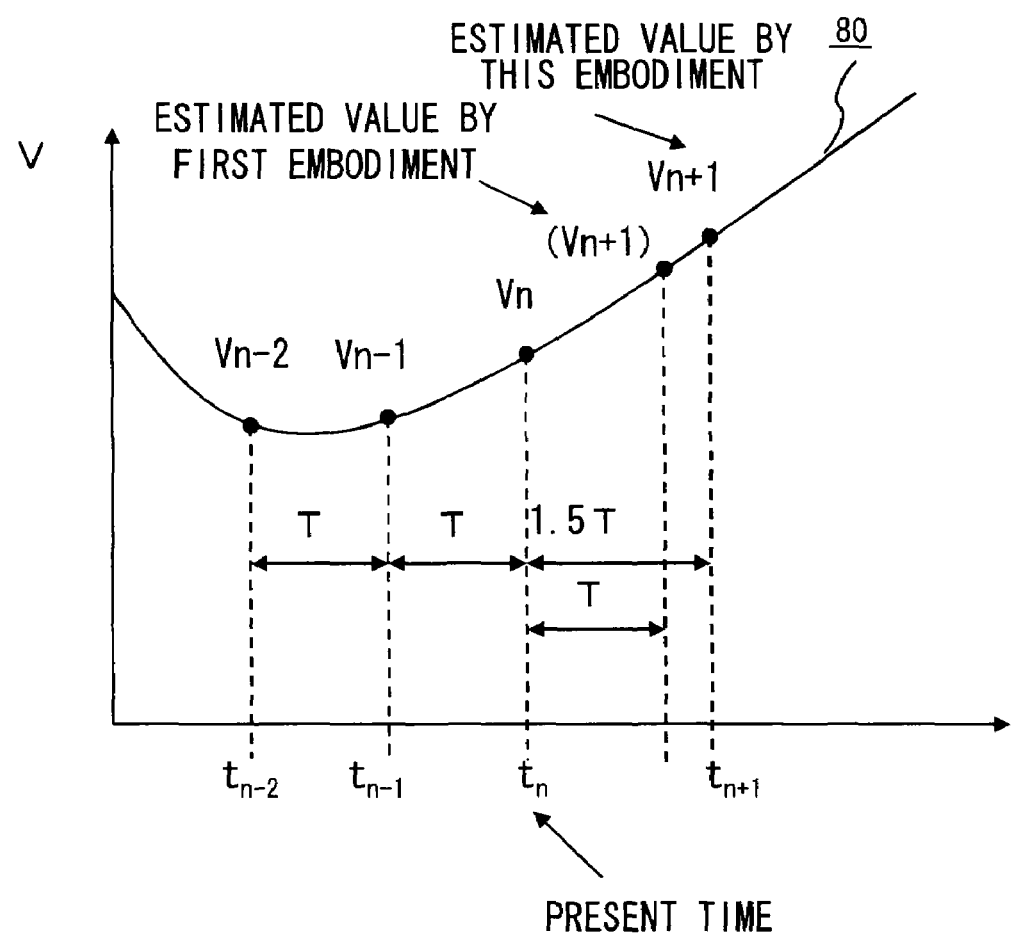
FIG. 15 is a diagram showing an operating principle of detected DC voltage value estimation means of the fifth embodiment of the present invention.

An operating principle of the detected DC voltage value estimation means 5d of the fifth embodiment is described hereunder. Specifically, in this fifth embodiment, regarding a DC voltage waveform as time series data and expressing the DC voltage waveform by a cubic function in the same way as in the first embodiment, the detected DC voltage value estimation means 5d estimates a DC voltage estimation value $V_{n+1}$ at a next time $t_{n+1}$ from a detected DC voltage value $V_n$ at a present sampling time (present time) $t_n$, a detected DC voltage value $V_{n-1}$ at a sampling time $t_{n-1}$ one sampling cycle before, and a detected DC voltage value $V_{n-2}$ at a sampling time $t_{n-2}$ two sampling cycles before. Unlike the first embodiment, however, the next time $t_{n+1}$ is taken at a time obtained by adding 0.5 T to a time when the sampling period T has elapsed from the present time $t_n$ taking into consideration a delay time of the power converter in this fifth embodiment. That is, the next sampling time $t_{n+1}$ is the time when 1.5 times the specific sampling period T has elapsed from the present time $t_n$ as shown in FIG. 15. Here, a curve connecting the DC voltage values $V_{n-2}$ to $V_{n+1}$ is expressed by a quadratic function. In this case, a relationship among the DC voltage estimation value $V_{n+1}$ at the time $t_{n+1}$ defined by adding 0.5 T to the next sampling time, the detected DC voltage value $V_n$ sampled at the present time $t_n$, the detected DC voltage value $V_{n-1}$ at the sampling time $t_{n-1}$ one sampling cycle before, and the detected DC voltage value $V_{n-2}$ at the sampling time $t_{n-2}$ two sampling cycles before can be expressed by equations (7) below:

$$V_{n-2} = a(t_{n-2})^2 + b(t_{n-2}) + c$$

$$V_{n-1} = a(t_{n-2}+T)^2 + b(t_{n-2}+T) + c$$

$$V_n = a(t_{n-2}+2T)^2 + b(t_{n-2}+2T) + c$$

$$V_{n+1} = a(t_{n-2}+3.5T)^2 + b(t_{n-2}+3.5T) + c \qquad (7)$$

Deleting arbitrary numbers a, b and c as well as $t_{n-2}$ and T from equations (7) above, the DC voltage estimation value $V_{n+1}$ at the next time is calculated as indicated by equation (8) below:

$$V_{n+1} = \frac{15}{8}V_{n-2} - \frac{21}{4}V_{n-1} + \frac{35}{8}V_n \qquad (8)$$

The detected DC voltage value estimation means 5d provided in a microcomputer 50 shown in FIG. 14 shows a configuration based on equation (8) above. The working of the detected DC voltage value estimation means 5d is now described with reference to FIG. 14.

A multiplier 12i of the detected DC voltage value estimation means 5d multiplies the detected DC voltage value $V_n$ detected at the present time $t_n$ by a specific constant "35/8" and outputs the product to an adder 10a. A multiplier 12k multiplies the detected DC voltage value $V_{n-1}$ detected at the time $t_{n-1}$ one sampling cycle before and stored in a first memory 8 by a specific constant "−21/4" and outputs the product to the adder 10a.

A multiplier 12j multiplies the detected DC voltage value $V_{n-2}$ detected at the sampling time $t_{n-2}$ two sampling cycles before and stored in a second memory 9 by a specific constant "15/8" and outputs the product to the adder 10a.

The adder 10a adds up the outputs of the multipliers 12i, 12k, 12j. Specifically, the detected DC voltage value estimation means 5d carries out a mathematical operation expressed by equation (8) and outputs the result of this operation to the output voltage control means 6 as the DC voltage estimation value $V_{n+1}$ at the time $t_{n+1}$ defined by adding 0.5 T to the next sampling time.

With this arrangement using the DC voltage estimation value at the time defined by adding 0.5 T to the next sampling time in consideration the delay of the power converter 1, it is possible to achieve more advantageous effects than in the first embodiment.

As thus far discussed, the power converting apparatus 100 of this fifth embodiment detects the DC voltage output from the rectification means 21 by the voltage sensing means 4, inputs the detected DC voltage value $V_n$ thus detected into the detected DC voltage value estimation means 5d provided in the microcomputer 50 at the arbitrarily set specific intervals of the period T, and performs the mathematical operation expressed by equation (8) shown earlier. Thus, the power converting apparatus 100 corrects the pulse-width modulation factor of the power converter 1 according to the DC voltage estimation value $V_{n+1}$ at the time $t_{n+1}$ defined by advancing the next sampling time by 0.5 T taking into consideration the delay time of the power converter as well, so that it is possible to sufficiently suppress the output voltage pulsation caused by the pulsation component of the DC voltage and thereby reduce the beat phenomenon of the output current too.

In the conventional microcomputer control approach, the control signal output from a microcomputer is reflected in the power converter with a delay including a delay of the power converter in addition to a delay of one sampling cycle after detection of the DC voltage, so that the output voltage pulsation can not be suppressed sufficiently.

In this fifth embodiment, however, detected DC voltage values at sampling times one and two sampling cycles before the present time are detected by the detected DC voltage value estimation means 5d provided in the microcomputer 50 at the specific sampling intervals and the DC voltage estimation value $V_{n+1}$ at the time $t_{n+1}$ advanced from the next sampling time by 0.5 T considering also the delay of the power converter is estimated by regarding a DC voltage waveform 80 formed by connecting these values as a quadratic function, so that the aforementioned problem of the conventional microcomputer control approach caused by the one sampling cycle control delay and the delay of the power converter is overcome.

While, in this fifth embodiment, the DC voltage estimation value at the time advanced from the next sampling time by 0.5 T is determined by regarding the DC voltage waveform as time series data and expressing the DC voltage waveform by a cubic function in the same way as in the first embodiment, it is possible to determine the DC voltage estimation value at the time advanced from the next sampling time by 0.5 T by regarding the DC voltage waveform as a cubic function as in the third embodiment. Specifically, it is possible to express the DC voltage estimation value $V_{n+1}$ at the next time $t_{n+1}$, the detected DC voltage value $V_n$ at the present sampling time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, and the detected DC voltage value $V_{n-3}$ at the sampling time $t_{n-3}$ three sampling cycles before by equations (9) below:

$$V_{n-3}=a(t_{n-3})^3+b(t_{n-3})^2+c(t_{n-3})+d$$

$$V_{n-2}=a(t_{n-3}+T)^3+b(t_{n-3}+T)^2+c(t_{n-3}T)+d$$

$$V_{n-1}=a(t_{n-3}+2T)^3+b(t_{n-3}+2T)^2+c(t_{n-3}+3\text{ T})+d$$

$$V_n=a(t_{n-3}+3T)^3+b(t_{n-3}+3T)^2+c(t_{n-3}+3T)^2+c(t_{n-3}+3T)+d$$

$$V_{n+1}=a(t_{n-3}+4.5T)^3+b(t_{n-3}+4.5T)^2+c(t_{n-3}+4.5T)+d \quad (9)$$

Deleting a, b, c and d as well as $t_{n-2}$ and T from equations (9) above, the DC voltage estimation value $V_{n+1}$ at the next time $t_{n+1}$ is calculated as indicated by equation (10) below:

$$V_{n+1} = \frac{1}{16}(105V_n - 189V_{n-1} + 135V_{n-2} - 35V_{n-3}) \quad (10)$$

It is also possible to determine the DC voltage estimation value at the time advanced from the next sampling time by 0.5 T by regarding the DC voltage waveform as a quartic function as in the fourth embodiment and use the DC voltage estimation value thus determined. Specifically, it is possible to express the DC voltage estimation value $V_{n+1}$ at the next time $t_{n+1}$, the detected DC voltage value $V_n$ at the present sampling time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, the detected DC voltage value $V_{n-3}$ at the sampling time $t_{n-3}$ three sampling cycles before, and the detected DC voltage value $V_{n-4}$ at the sampling time $t_{n-4}$ four sampling cycles before by equations (11) below:

$$V_{n-4}=a(t_{n-4})^4+b(t_{n-4})^3+c(t_{n-4})^2+d(t_{n-4})+e$$

$$V_{n-3}=a(t_{n-4}+T)^4+b(t_{n-4}+T)^3+c(t_{n-4}+T)^2+d(t_{n-4}+T)+e$$

$$V_{n-2}=a(t_{n-4}+2T)^4+b(t_{n-4}+2T)^3+c(t_{n-4}+2T)^2+d(t_{n-4}+2T)+e$$

$$V_{n-1}=a(t_{n-4}+3T)^4+b(t_{n-4}+3T)^3+c(t_{n-4}+3T)^2+d(t_{n-4}+3T)+e$$

$$V_n=a(t_{n-4}+4T)^4+b(t_{n-4}+4T)^3+c(t_{n-4}+4T)^2+d(t_{n-4}+4T)+e$$

$$V_{n+1}=a(t_{n-4}+5.5T)^4+b(t_{n-4}+5.5T)^3+c(t_{n-4}+5.5T)^2+d(t_{n-4}+5.5T)+e \quad (11)$$

Deleting a, b, c, d and e as well as $t_{n-4}$ and T from equations (11) above, the DC voltage value $V_{n+1}$ at the time $t_{n+1}$ advanced from the next sampling time by 0.5 T is calculated as indicated by equation (12) below:

$$V_{n+1} = \frac{1155}{128}V_n - \frac{693}{32}V_{n-1} + \frac{1485}{64}V_{n-2} - \frac{385}{32}V_{n-3} + \frac{315}{128}V_{n-4} \quad (12)$$

As seen above, the same effect is obtained by using the DC voltage estimation value $V_{n+1}$ at the time $t_{n+1}$ advanced from the next sampling time by 0.5 T based on equations (10) and (11) as well.

Sixth Embodiment

Figure 16:
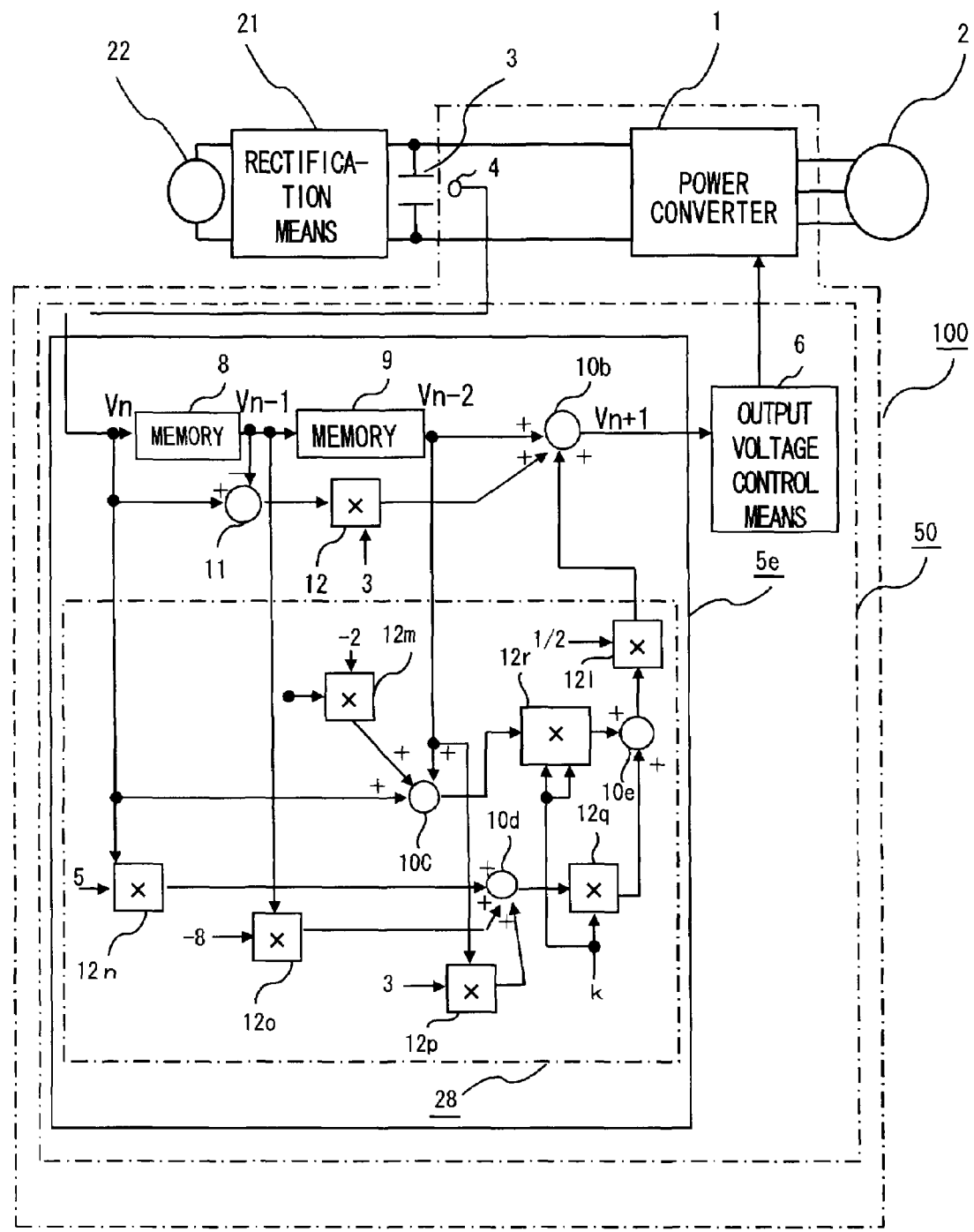
FIG. 16 is a block diagram showing a power converting apparatus according to a sixth embodiment of the present invention.

FIG. 16 is a block diagram showing the configuration of a power converting apparatus 100 according to a sixth embodiment of the present invention.

FIG. 16 differs from FIG. 1 of the sixth embodiment only in that a detected DC voltage value estimation means 5e has a different configuration. Thus, the detected DC voltage value estimation means 5e shown in FIG. 16 is described hereinbelow.

The power converting apparatus 100 of the sixth embodiment is configured to overcome a problem concerning not only a delay in sampling cycle control but also a delay of the power converter, that is, a delay from a point in time when the output voltage control means 6 sends a voltage command to a point in time when a switching device of the power converter 1 operates, causing the power converter 1 to apply a voltage to the AC rotary machine 2. In other words, the inventors have discovered that it becomes possible to sufficiently suppress pulsation of an output voltage caused by a pulsation component of the DC voltage and thereby reduce the beat phenomenon of an output current as compared to the first embodiment by taking into consideration the delay of the power converter in addition to the delay in sampling cycle control. The detected DC voltage value estimation means 5e is configured to include a power converter delay compensator 28 for compensating for the delay of the power converter 1 in addition to the detected DC voltage value estimation means 5 of the first embodiment.

An operating principle of the detected DC voltage value estimation means 5e of the sixth embodiment is described hereunder. Specifically, in this sixth embodiment, regarding a DC voltage waveform as time series data and expressing the DC voltage waveform by a quadratic function in the same way as in the first embodiment, the detected DC voltage value estimation means 5e estimates a DC voltage estimation value $V_{n+1}$ at a next time $t_{n+1}$ from a detected DC voltage value $V_n$ at a present sampling time (present time) $t_n$, a detected DC voltage value $V_{n-1}$ at a sampling time $t_{n-1}$ one sampling cycle before, and a detected DC voltage value $V_{n-2}$ at a sampling time $t_{n-2}$ two sampling cycles before.

Figure 17:
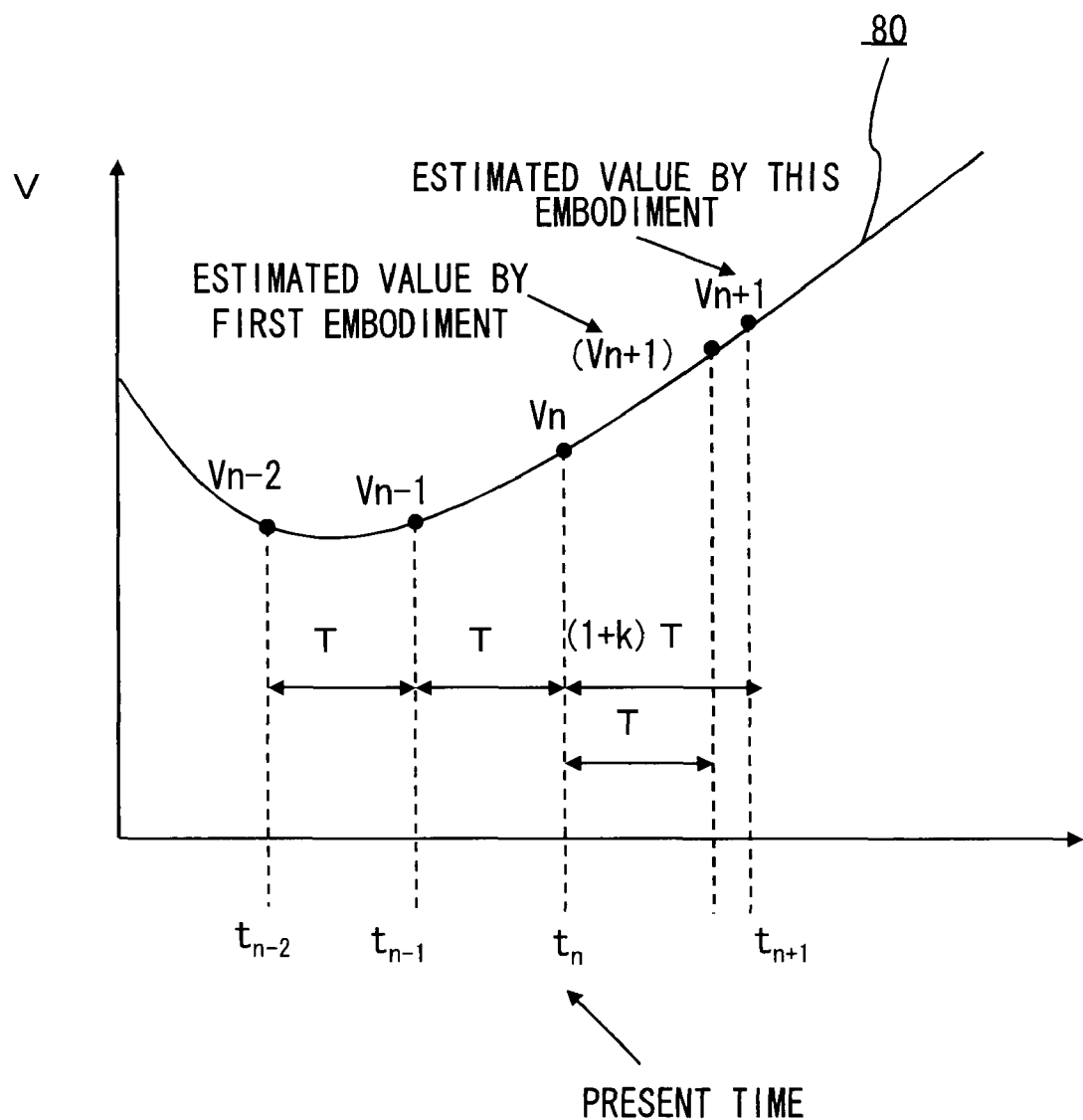
FIG. 17 is a diagram showing an operating principle of detected DC voltage value estimation means of the sixth embodiment of the present invention.

Unlike the first embodiment, however, the next time $t_{n+1}$ is taken at a time obtained by adding k·T to a time when the sampling period T has elapsed from the present time $t_n$ taking into consideration a delay time of the power converter in this sixth embodiment. That is, the next sampling time $t_{n+1}$ is the time when (1+k) times the specific sampling period T has elapsed from the present time $t_n$ as shown in FIG. 17. Here, a curve connecting the values $V_{n-2}$ to $V_{n+1}$ is expressed by a quadratic function. In this case, a relationship among the DC voltage estimation value $V_{n+1}$ at the time $t_{n+1}$ defined by adding k·T to the next sampling time, the detected DC voltage value V, sampled at the present time $t_n$, the detected DC voltage value $V_{n-1}$ at the sampling time $t_{n-1}$ one sampling cycle before, and the detected DC voltage value $V_{n-2}$ at the sampling time $t_{n-2}$ two sampling cycles before can be expressed by equations (13) below. It is to be noted that the time period k×T is for taking into consideration a switching delay of the power converter 1 and a delay factor due to dead time of devices and can be determined by the performance and configuration of the power converter 1, where k satisfies 0<k<1.

$$V_{n-2} = a(t_{n-2})^2 + b(t_{n-2}) + c$$

$$V_{n-1} = a(t_{n-2}+T)^2 + b(t_{n-2}+T) + c$$

$$V_n = a(t_{n-2}+2T)^2 + b(t_{n-2}+2T) + c$$

$$V_{n+1} = a(t_{n-2}+(2+k)T)^2 + b(t_{n-2}+(3+k)T)c \qquad (13)$$

Deleting arbitrary numbers a, b and c as well as $t_{n-2}$ and T from equations (13) above, the DC voltage estimation value $V_{n+1}$ at the time $t_{n+1}$ defined by adding k×T to the next sampling time is calculated as indicated by equation (14) below:

$$V_{n+1} = V_{n-2} + 3(V_n - V_{n-1}) + \frac{1}{2}k^2(V_{n-2} + V_n - 2V_{n-1}) + \frac{1}{2}k(3V_{n-2} + 5V_n - 8V_{n-1}) \qquad (14)$$

The detected DC voltage value estimation means 5e provided in a microcomputer 50 shown in FIG. 16 shows a configuration based on equation (14) above. The working of the detected DC voltage value estimation means 5e is now described with reference to FIG. 16.

A subtracter 11 of the detected DC voltage value estimation means 5e subtracts the detected DC voltage value $V_{n-1}$ detected at the time $t_{n-1}$ one sampling cycle before and stored in a first memory 8 from the detected DC voltage value $V_n$ detected at the present time $t_n$, and a multiplier 12 multiplies an output of the subtracter 11 by a specific constant "3". An adder 10b adds the result of this calculation and the detected DC voltage value $V_{n-2}$ detected at the time $t_{n-2}$ two sampling cycles before and stored in a second memory 9. In short, the detected DC voltage value estimation means 5e carries out a mathematical operation expressed by equation (2) in the same way as in the first embodiment.

A multiplier 12n of the power converter delay compensator 28 multiplies the detected DC voltage value $V_n$ detected at the present time $t_n$ by a specific constant "5" and outputs the product to an adder 10d. A multiplier 12o of the power converter delay compensator 28 multiplies the detected DC voltage value $V_{n-1}$ detected at the time $t_{n-1}$ one sampling cycle before and stored in the first memory 8 by a specific constant "−8" and outputs the product to the adder 10d.

A multiplier 12p of the power converter delay compensator 28 multiplies the detected DC voltage value $V_{n-2}$ detected at the sampling time $t_{n-2}$ two sampling cycles before and stored in the second memory 9 by a specific constant "3" and outputs the product to the adder 10d. The adder 10d adds up the outputs of the multipliers 12n, 12o, 12p and outputs the result of addition to a multiplier 12q which multiplies the result of addition by k representative of the delay time of the power converter and outputs the product to an adder 10e.

Also, a multiplier 12m of the power converter delay compensator 28 multiplies the detected DC voltage value $V_{n-1}$ detected at the time $t_{n-1}$ one sampling cycle before and stored in the first memory 8 by a specific constant "−2" and outputs the product to an adder 10c which adds a value obtained by multiplication, the detected DC voltage value $V_n$ detected at the present time $t_n$ and the detected DC voltage value $V_{n-2}$ detected at the sampling time $t_{n-2}$ two sampling cycles before and stored in the second memory 9. A multiplier 12r multiplies a value obtained by addition by the adder 10c by a square of the specific constant "k". Values obtained as a result of calculations by the multiplier 12r and the multiplier 12q are added by the adder 10e. A multiplier 12l multiplies a value obtained by this addition by a specific constant "1/2" and outputs the product to the adder 10b.

The adder 10b adds the output of the multiplier 12l and a value obtained by performing the mathematical operation expressed by equation (2) in the same way as in the first embodiment. In short, the adder 10b carries out a mathematical operation expressed by equation (14) and outputs the result of this calculation to output voltage control means 6 as the DC voltage estimation value $V_{n+1}$ at the time $t_{n+1}$ defined by adding the delay time k×T of the power converter to the next sampling time.

With this arrangement using the DC voltage estimation value at the time defined by adding k×T to the next sampling time in consideration the delay of the power converter 1, it is possible to achieve more advantageous effects than in the first embodiment.

As thus far discussed, the power converting apparatus 100 of this sixth embodiment detects the DC voltage output from the rectification means 21 by the voltage sensing means 4, inputs the detected DC voltage value $V_n$ thus detected into the detected DC voltage value estimation means 5e provided in the microcomputer 50 at the arbitrarily set specific intervals of the period T, and performs the mathematical operation expressed by equation (14) shown earlier. Thus, the power converting apparatus 100 corrects the pulse-width modulation factor of the power converter 1 according to the DC voltage estimation value $V_{n+1}$ at the time $t_{n+1}$ defined by advancing the next sampling time by k×T taking into consideration the delay time of the power converter as well, so that it is possible to sufficiently suppress the output voltage pulsation caused by the pulsation component of the DC voltage and thereby reduce the beat phenomenon of the output current too.

In the conventional microcomputer control approach, the control signal output from a microcomputer is reflected in the power converter with a delay including a delay of the power converter in addition to a delay of one sampling cycle after detection of the DC voltage, so that the output voltage pulsation can not be suppressed sufficiently. In this sixth embodiment, however, detected DC voltage values at sampling times one and two sampling cycles before the present time are detected by the detected DC voltage value estimation means 5e provided in the microcomputer 50 at the specific sampling intervals and the DC voltage estimation value $V_{n+1}$ at the time $t_{n+1}$ advanced from the next sampling time by k×T considering also the delay of the power converter is estimated by regarding a DC voltage waveform 80 formed by connecting these values as a quadratic function, so that the aforementioned drawback of the conventional microcomputer control approach caused by the one sampling cycle control delay and the delay of the power converter is overcome.

While, in this sixth embodiment, the DC voltage estimation value at the time advanced from the next sampling time by k×T considering the delay of the power converter is determined by regarding the DC voltage waveform as time series data and expressing the DC voltage waveform by a quadratic function in the same way as in the first embodiment, it is possible to determine the DC voltage estimation value at the time advanced from the next sampling time by k×T considering the delay of the power converter by regarding the DC voltage waveform as a cubic function as in the third embodiment. Specifically, it is possible to express the DC voltage estimation value $V_{n+1}$ at the next time $t_{n+1}$, the detected DC voltage value $V_n$ at the present sampling time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, and the detected DC voltage value $V_{n-3}$ at the sampling time $t_{n-3}$ three sampling cycles before by equations (15) below:

$$V_{n-3} = a(t_{n-3})^3 + b(t_{n-3})^2 + c(t_{n-3}) + d$$

$$V_{n-2} = a(t_{n-3}+T)^3 + b(t_{n-3}+T)^2 + c(t_{n-3}+T) + d$$

$$V_{n-1} = a(t_{n-3}+2T)^3 + b(t_{n-3}+2T)^2 + c(t_{n-3}+2T) + d$$

$$V_n = a(t_{n-3}+3T)^3 + b(t_{n-3}+3T)^2 + c(t_{n-3}+3T) + d$$

$$V_{n+1} = a(t_{n-3}+(4+k)T)^3 + b(t_{n-3}+(4+k)T)^2 + c(t_{n-3}+(4+k)T) + d \quad (15)$$

Deleting a, b, c and d as well as $t_{n-3}$ and T from equations (15) above, the DC voltage estimation value $V_{n+1}$ at the time advanced from the next sampling time by k×T is calculated as indicated by equation (16) below:

$$V_{n+1} = \qquad (16)$$

$$4(V_n + V_{n-2}) - 6V_{n-1} - V_{n-3} + \frac{k^3}{6}(V_n - 3V_{n-1} + 3V_{n-2} - V_{n-3}) +$$

$$\frac{k^2}{2}(3V_n - 8V_{n-1} + 7V_{n-2} - 2V_{n-3}) +$$

$$\frac{k}{6}(26V_n - 57V_{n-1} + 42V_{n-2} - 11V_{n-3})$$

It is also possible to determine the DC voltage estimation value at the time advanced from the next sampling time by k×T considering the delay of the power converter by regarding the DC voltage waveform as a quartic function as in the fourth embodiment and use the DC voltage estimation value thus determined. Specifically, it is possible to express the DC voltage estimation value $V_{n+1}$ at the next time $t_{n+1}$, the detected DC voltage value $V_n$ at the present sampling time $t_n$, the detected DC voltage value $V_{n-1}$ at the sampling time $t_{n-1}$ one sampling cycle before, the detected DC voltage value $V_{n-2}$ at the sampling time $t_{n-2}$ two sampling cycles before, the detected DC voltage value $V_{n-3}$ at the sampling time $t_{n-3}$ three sampling cycles before, and the detected DC voltage value $V_{n-4}$ at the sampling time $t_{n-4}$ four sampling cycles before by equations (17) below:

$$V_{n-4} = a(t_{n-4})^4 + b(t_{n-4})^3 + c(t_{n-4})^2 + d(t_{n-4}) + e$$

$$V_{n-3} = a(t_{n-4}+T)^4 + b(t_{n-4}+T)^3 + c(t_{n-4}+T)^2 + d(t_{n-4}+T) + e$$

$$V_{n-2} = a(t_{n-4}+2T)^4 + b(t_{n-4}+2T)^3 + c(t_{n-4}+2T)^2 + d(t_{n-4}+2T) + e$$

$$V_{n-1} = a(t_{n-4}+3T)^4 + b(t_{n-4}+3T)^3 + c(t_{n-4}+3T)^2 + d(t_{n-4}+3T) + e$$

$$V_n = a(t_{n-4}+4T)^4 + b(t_{n-4}+4T)^3 + c(t_{n-4}+4T)^2 + d(t_{n-4}+4T) + e$$

$$V_{n+1} = a(t_{n-4}+(5+k)T)^4 + b(t_{n-4}+(5k)T)^3 + c(t_{n-4}+(5+k)T)^2 + d(t_{n-4}+(5+k)T) + e \quad (17)$$

Deleting a, b, c, d and e as well as $t_{n-4}$ and T from equations (17) above, the DC voltage estimation value $V_{n+1}$ at the time advanced from the next sampling time by k×T is calculated as indicated by equation (18) below:

$$V_{n+1} = 5(V_n - V_{n-3}) - 10(V_{n-1} - V_{n-2}) + \qquad (18)$$

$$V_{n-4} + \frac{k^4}{24}(V_n - 4V_{n-1} + 6V_{n-2} - 4V_{n-3} + V_{n-4}) +$$

$$\frac{k^3}{12}(7V_n + 13V_{n-1} + 36V_{n-2} - 22V_{n-3} + 5V_{n-4}) +$$

$$\frac{K^2}{24}(71V_n - 236V_{n-1} + 294V_{n-2} - 164V_{n-3} + 35V_{n-4}) +$$

$$\frac{k}{12}(77V_n - 214V_{n-1} + 234V_{n-2} - 122V_{n-3} + 25V_{n-4})$$

As seen above, the same effect is obtained by using the DC voltage estimation value at the time advanced from the next sampling time by k×T considering the delay of the power converter based on equations (16) and (18) as well.

Seventh Embodiment

A detected DC voltage value estimation means 5c of a power converting apparatus 100 according to a seventh embodiment is configured to include filter means 27 provided in an upstream stage as shown in FIG. 18. The filter means 27 is a first-order lag filter or a high-frequency cutoff filter. A cutoff frequency for noise removal of the filter means 27 is set sufficiently higher than the frequency of a pulsation component contained in the DC voltage. This makes it possible to suppress the beat phenomenon of the output current of the power converter 1 and detect the DC voltage upon removing noise caused by switching, for instance, so that there is provided an effect of improving the reliability of the detected DC voltage value estimation means 5c and the power converting apparatus 100.

While the first to seventh embodiments of the present invention have illustrated a case in which the load connected to the power converting apparatus 100 is an AC rotary machine, the AC rotary machine need not necessarily be limited to an induction machine or a synchronous machine but the same advantageous effects can be anticipated with any kinds of AC rotary machines.

The same advantageous effects can also be anticipated if the invention is applied to a power converting apparatus for controlling such an electromagnetic actuator as a linear induction motor, a linear synchronous motor or a solenoid, besides the AC rotary machines.

INDUSTRIAL APPLICABILITY

The power converting apparatus of the present invention is applicable to an inverter apparatus which drives an AC rotary machine at variable speed by converting a DC voltage into AC power of a variable frequency and voltage, for example.

The invention claimed is:
1. A power converting apparatus comprising:
    a power converter into which a DC voltage of rectification means for rectifying an AC power supply is input, said power converter being configured to control and drive a load;
    voltage sensing means for detecting the DC voltage of said rectification means;
    detected DC voltage value estimation means into which a detected DC voltage value detected by said voltage sens- ing means is input, said detected DC voltage value estimation means being configured to output the DC voltage estimation value; and output voltage control means into which an output of said detected DC voltage value estimation means is input, said output voltage control means being configured to control an output voltage of said power converter;

wherein said detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles (m≧1) before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a quadratic function;

wherein said detected DC voltage value estimation means calculates the DC voltage estimation value $V_{n+1}$ at the next time $t_{n+1}$ with the next time $t_{n+1}$ defined as a time when the specific period T has elapsed from the present time $t_n$;

wherein the sampling cycle is set such that a value obtained by dividing the reciprocal of the sampling cycle by the frequency of a pulsation component contained in the DC voltage falls within a range of 10 to 1667; and wherein said output voltage control means into which the DC voltage estimation value $V_{n+1}$ is input corrects an output voltage command value and outputs the corrected output voltage command value to said power converter.

2. The power converting apparatus as recited in claim 1, wherein said rectification means rectifies an AC voltage from the AC power supply by a separately-excited rectification circuit using a diode rectification circuit or a bridge rectification circuit or a self-commutated rectification circuit using a converter which performs PWM control operation.

3. The power converting apparatus as recited in claim 1, wherein said detected DC voltage value estimation means is provided with filter means.

4. A power converting apparatus comprising:

a power converter into which a DC voltage of rectification means for rectifying an AC power supply is input, said power converter being configured to control and drive a load;

voltage sensing means for detecting the DC voltage of said rectification means;

detected DC voltage value estimation means into which a detected DC voltage value detected by said voltage sensing means is input, said detected DC voltage value estimation means being configured to output the DC voltage estimation value; and output voltage control means into which an output of said detected DC voltage value estimation means is input, said output voltage control means being configured to control an output voltage of said power converter;

wherein said detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles (m before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a polynomial function of which degree is at least three;

wherein said detected DC voltage value estimation means calculates the DC voltage estimation value $V_{n+1}$ at the next time $t_{n+1}$ with the next time $t_{n+1}$ defined as a time when the specific period T has elapsed from the present time $t_n$; and wherein said output voltage control means into which the DC voltage estimation value $V_{n+1}$ is input corrects an output voltage command value and outputs the corrected output voltage command value to said power converter.

5. The power converting apparatus as recited in claim 4, wherein expressing a curve connecting a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a cubic function, said detected DC voltage value estimation means calculates the DC voltage estimation value $V_{n+1}$ by the following equation:

$$V_{n+1}=4(V_n+V_{n-2})-6V_{n-1}-V_{n-3}.$$

6. The power converting apparatus as recited in claim 4, wherein expressing a curve connecting a detected DC voltage value $V_{n-4}$ detected at a sampling time four sampling cycles before the present time, a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quartic function, said detected DC voltage value estimation means calculates the DC voltage estimation value $V_{n+1}$ by the following equation:

$$V_{n+1}=5(V_n-V_{n-3})-10(V_{n-1}-V_{n-2})+V_{n-4}.$$

7. The power converting apparatus as recited in claim 4, wherein the sampling cycle is set such that a value obtained by dividing the reciprocal of the sampling cycle by the frequency of a pulsation component contained in the DC voltage falls within a range of 10 to 1667.

8. A power converting apparatus comprising:

a power converter into which a DC voltage of rectification means for rectifying an AC power supply is input, said power converter being configured to control and drive a load;

voltage sensing means for detecting the DC voltage of said rectification means;

detected DC voltage value estimation means into which a detected DC voltage value detected by said voltage sensing means is input, said detected DC voltage value estimation means being configured to output the DC voltage estimation value; and output voltage control means into which an output of said detected DC voltage value estimation means is input, said output voltage control means being configured to control an output voltage of said power converter;

wherein said detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles (m≧1) before the present time $t_n$, and calculates a DC voltage estimation value $V_{n+1}$ at a next time $t_{n+1}$ by the following equation, expressing a curve connecting a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quadratic function, $$V_{n+1}=3(V_n-V_{n-1})+V_{n-2}; \text{ and}$$

wherein said output voltage control means into which the DC voltage estimation value $V_{n+1}$ is input corrects an output voltage command value and outputs the corrected output voltage command value to said power converter.

9. A power converting apparatus comprising:
a power converter into which a DC voltage of rectification means for rectifying an AC power supply is input, said power converter being configured to control and drive a load;
voltage sensing means for detecting the DC voltage of said rectification means;
detected DC voltage value estimation means into which a detected DC voltage value detected by said voltage sensing means is input, said detected DC voltage value estimation means being configured to output the DC voltage estimation value; and
output voltage control means into which an output of said detected DC voltage value estimation means is input, said output voltage control means being configured to control an output voltage of said power converter;
wherein said detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles (m≧1) before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a specific function;
wherein said detected DC voltage value estimation means calculates the DC voltage estimation value $V_{n+1}$ at the next time $t_{n+1}$ with the next time $t_{n+1}$ defined as a time when a period of time 1.5 times the specific period T has elapsed from the present time $t_n$; and
wherein said output voltage control means into which the DC voltage estimation value $V_{n+1}$ is input corrects an output voltage command value and outputs the corrected output voltage command value to said power converter.

10. The power converting apparatus as recited in claim 9, wherein expressing a curve connecting a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quadratic function, said detected DC voltage value estimation means calculates the DC voltage estimation value $V_{n+1}$ by the following equation:

$$V_{n+1} = \frac{15}{8}V_{n-2} - \frac{21}{4}V_{n-1} + \frac{35}{8}V_n.$$

11. The power converting apparatus as recited in claim 9, wherein expressing a curve connecting a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a cubic function, said detected DC voltage value estimation means calculates the DC voltage estimation value $V_{n+1}$ by the following equation:

$$V_{n+1} = \frac{1}{16}(105V_n - 189V_{n-1} + 135V_{n-2} - 35V_{n-3}).$$

12. The power converting apparatus as recited in claim 9, wherein expressing a curve connecting a detected DC voltage value $V_{n-4}$ detected at a sampling time four sampling cycles before the present time, a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quartic function, said detected DC voltage value estimation means calculates the DC voltage estimation value $V_{n+1}$ by the following equation:

$$V_{n+1} = \frac{1155}{128}V_n - \frac{693}{32}V_{n-1} + \frac{1485}{64}V_{n-2} - \frac{385}{32}V_{n-3} + \frac{315}{128}V_{n-4}.$$

13. A power converting apparatus comprising:
a power converter into which a DC voltage of rectification means for rectifying an AC power supply is input, said power converter being configured to control and drive a load;
voltage sensing means for detecting the DC voltage of said rectification means;
detected DC voltage value estimation means into which a detected DC voltage value detected by said voltage sensing means is input, said detected DC voltage value estimation means being configured to output the DC voltage estimation value; and
output voltage control means into which an output of said detected DC voltage value estimation means is input, said output voltage control means being configured to control an output voltage of said power converter;
wherein said detected DC voltage value estimation means samples the detected DC voltage value at specific intervals of a period T, stores detected DC voltage values $V_n$ to $V_{n-m}$ detected at a present time $t_n$ up to a sampling time $t_{n-m}$ which is m sampling cycles (m≧1) before the present time $t_n$, and calculates a DC voltage estimation value $V_{n+1}$ at a next time $t_{n+1}$ using the detected DC voltage values $V_n$ to $V_{n-m}$, expressing a curve connecting the voltage values $V_n$ to $V_{n-m}$ by a specific function;
wherein said detected DC voltage value estimation means calculates the DC voltage estimation value $V_{n+1}$ at the next time $t_{n+1}$ with the next time $t_{n+1}$ defined as a time when a period of time (1+k) times the specific period T has elapsed from the present time $t_n$, where k satisfies 0<k<1; and
wherein said output voltage control means into which the DC voltage estimation value $V_{n+1}$ is input corrects an output voltage command value and outputs the corrected output voltage command value to said power converter.

14. The power converting apparatus as recited in claim 13, wherein expressing a curve connecting a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quadratic function, said detected DC voltage value estimation means calculates the DC voltage estimation value $V_{n+1}$ by the following equation:

$$V_{n+1} = V_{n-2} + 3(V_n - V_{n-1}) + \frac{1}{2}k^2(V_{n-2} + V_n - 2V_{n-1}) + \frac{1}{2}k(3V_{n-2} + 5V_n - 8V_{n-1}).$$

15. The power converting apparatus as recited in claim 13, wherein expressing a curve connecting a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a cubic function, said detected DC voltage value estimation means calculates the DC voltage estimation value $V_{n+1}$ by the following equation:

$$V_{n+1} = 4(V_n + V_{n-2}) - 6V_{n-1} - V_{n-3} + \frac{k^3}{6}(V_n - 3V_{n-1} + 3V_{n-2} - V_{n-3}) + \frac{k^2}{2}(3V_n - 8V_{n-1} + 7V_{n-2} - 2V_{n-3}) + \frac{k}{6}(26V_n - 57V_{n-1} + 42V_{n-2} - 11V_{n-3}).$$

16. The power converting apparatus as recited in claim 13, wherein expressing a curve connecting a detected DC voltage value $V_{n-4}$ detected at a sampling time four sampling cycles before the present time, a detected DC voltage value $V_{n-3}$ detected at a sampling time three sampling cycles before the present time, a detected DC voltage value $V_{n-2}$ detected at a sampling time two sampling cycles before the present time, a detected DC voltage value $V_{n-1}$ detected at a sampling time one sampling cycle before the present time, the detected DC voltage value $V_n$ detected at the present time $t_n$ and the DC voltage estimation value $V_{n+1}$ by a quartic function, said detected DC voltage value estimation means calculates the DC voltage estimation value $V_{n+1}$ by the following equation:

$$V_{n+1} = 5(V_n - V_{n-3}) - 10(V_{n-1} - V_{n-2}) + V_{n-4} + \frac{k^4}{24}(V_n - 4V_{n-1} + 6V_{n-2} - 4V_{n-3} + V_{n-4}) + \frac{k^3}{12}(7V_n + 13V_{n-1} + 36V_{n-2} - 22V_{n-3} + 5V_{n-4}) + \frac{k^2}{24}(71V_n - 236V_{n-1} + 294V_{n-2} - 164V_{n-3} + 35V_{n-4}) + \frac{k}{12}(77V_n - 214V_{n-1} + 234V_{n-2} - 122V_{n-3} + 25V_{n-4}).$$

* * * * *